(12) United States Patent
Veternik et al.

(10) Patent No.: US 9,878,837 B2
(45) Date of Patent: Jan. 30, 2018

(54) FOOD PACKAGING HAVING OPENING FEATURE

(71) Applicant: Intercontinental Great Brands LLC, East Hanover, NJ (US)

(72) Inventors: Paul Veternik, Munich (DE); Stefan Scheuch, Munich (DE); Ronald H. Exner, Icking (DE); Olav Dagestad, Oslo (NO); Paul E. Doll, Madison, WI (US); Deborah A. Lyzenga, Long Valley, NJ (US)

(73) Assignee: Kraft Foods R & D, Inc., Deerfield, IL (US)

( * ) Notice: Subject to any disclaimer, the term of this patent is extended or adjusted under 35 U.S.C. 154(b) by 44 days.

(21) Appl. No.: 14/466,006

(22) Filed: Aug. 22, 2014

(65) Prior Publication Data
US 2014/0363545 A1    Dec. 11, 2014

Related U.S. Application Data

(63) Continuation of application No. 12/711,133, filed on Feb. 23, 2010, now Pat. No. 8,814,430.

(51) Int. Cl.
*B65D 33/08* (2006.01)
*B65D 33/14* (2006.01)
(Continued)

(52) U.S. Cl.
CPC ............. *B65D 77/32* (2013.01); *B23K 26/38* (2013.01); *B65B 9/10* (2013.01); *B65D 33/20* (2013.01);
(Continued)

(58) Field of Classification Search
CPC ............ B65D 75/58; B65D 75/5805; B65D 75/5811; B65D 75/5827; B65D 75/5833; B65D 75/5838; B65D 75/5844; B65D 75/585; B65D 75/5855; B65D 77/30; B65D 77/32; B65D 77/34; B65D 77/36; B65D 77/2028; B65D 77/2032; B65D 77/2036; B65D 77/204; B65D 77/2044; B65D 77/2048; B65D 77/2056; B65D 77/206; B65D 77/2068; B65D 77/2088;
(Continued)

(56) References Cited

U.S. PATENT DOCUMENTS 3,912,081 A * 10/1975 Haines ................ B65D 75/327
                                                     206/459.5
4,037,716 A *  7/1977 Marks ................. A45C 11/326
                                                     206/37.1
(Continued)

*Primary Examiner* — Jes F Pascua
*Assistant Examiner* — Nina Attel
(74) *Attorney, Agent, or Firm* — Fitch, Even, Tabin & Flannery LLP

(57) ABSTRACT

A package for a food product is provided and includes a fin seal, where the package is configured for controlled opening using an opening feature. The opening feature may include an integral flap separable from the remainder of the package to form an access opening to an interior of the package. The flap may be defined by one or more score or scribed lines that extend only partially through the package. The flap may have a portion extending into the fin seal area. Opening of the flap may expose adhesive of the fin seal area which can be utilized for attaching the flap to reclose the package.

15 Claims, 12 Drawing Sheets

(51) Int. Cl.
*B65D 77/32* (2006.01)
*B65D 75/58* (2006.01)
*B23K 26/38* (2014.01)
*B65B 9/10* (2006.01)
*B65D 77/38* (2006.01)
*B65D 75/12* (2006.01)
*B65D 33/20* (2006.01)

(52) U.S. Cl.
CPC ......... *B65D 75/12* (2013.01); *B65D 75/5838* (2013.01); *B65D 75/5844* (2013.01); *B65D 75/5855* (2013.01); *B65D 77/38* (2013.01); *B65D 33/14* (2013.01); *B65D 2575/565* (2013.01)

(58) Field of Classification Search
CPC .... B65D 77/2096; B65D 33/14; B65D 33/34; B65D 75/56; B65D 75/566; B65D 75/563; B65D 5/4208; B65D 33/06; B65D 33/065; B65D 33/08; B65D 2575/362; B65D 2575/365; B65D 2575/366; B65D 2575/367; B65D 2575/368
USPC ...... 383/22–24, 9, 6, 7, 10, 13, 17, 66, 200, 383/203, 207, 208, 210–211
See application file for complete search history.

(56) References Cited

U.S. PATENT DOCUMENTS

| | | | | |
|---|---|---|---|---|
| 4,574,951 | A | * | 3/1986 | Weaver ............ B65D 75/5816 206/461 |
| 4,658,963 | A | * | 4/1987 | Jud .................... B65D 75/585 229/87.05 |
| 5,470,015 | A | * | 11/1995 | Jud ................... B65D 75/5844 229/87.05 |
| 2010/0172604 | A1 | * | 7/2010 | Andersson .......... B65D 75/366 383/211 |

* cited by examiner

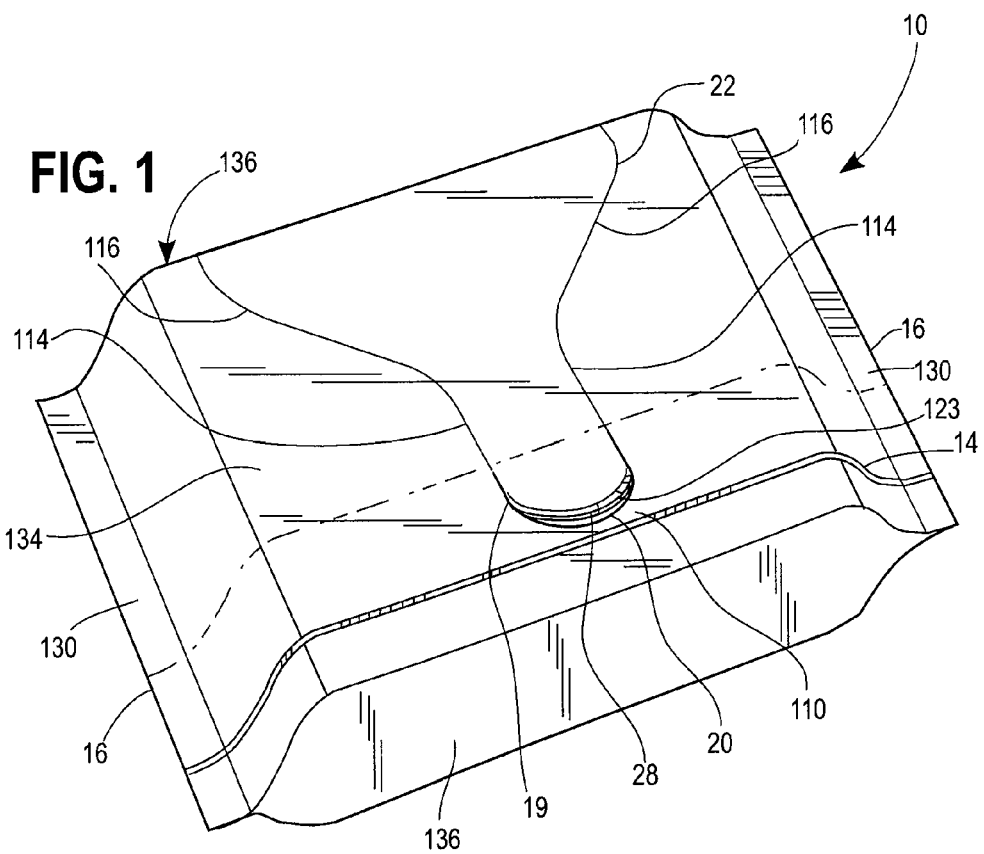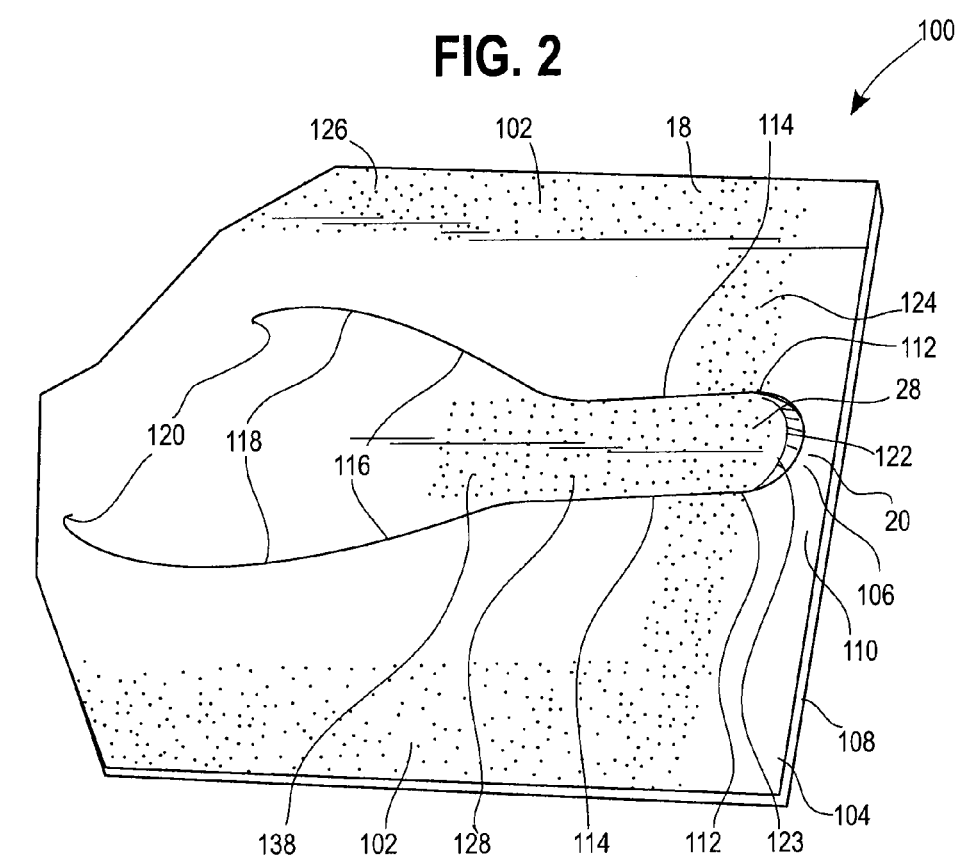

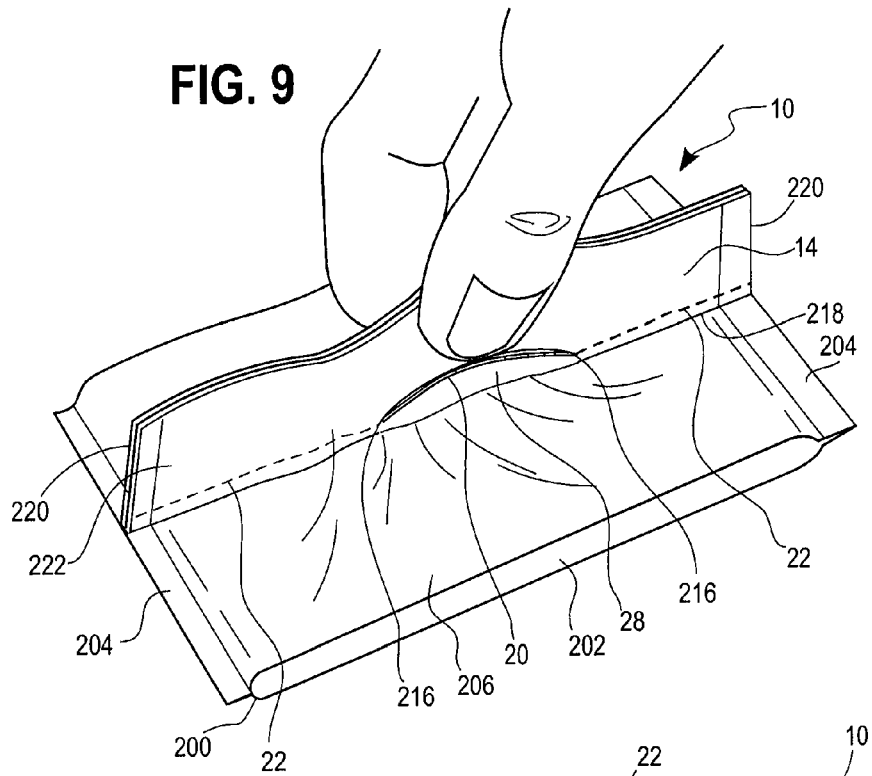
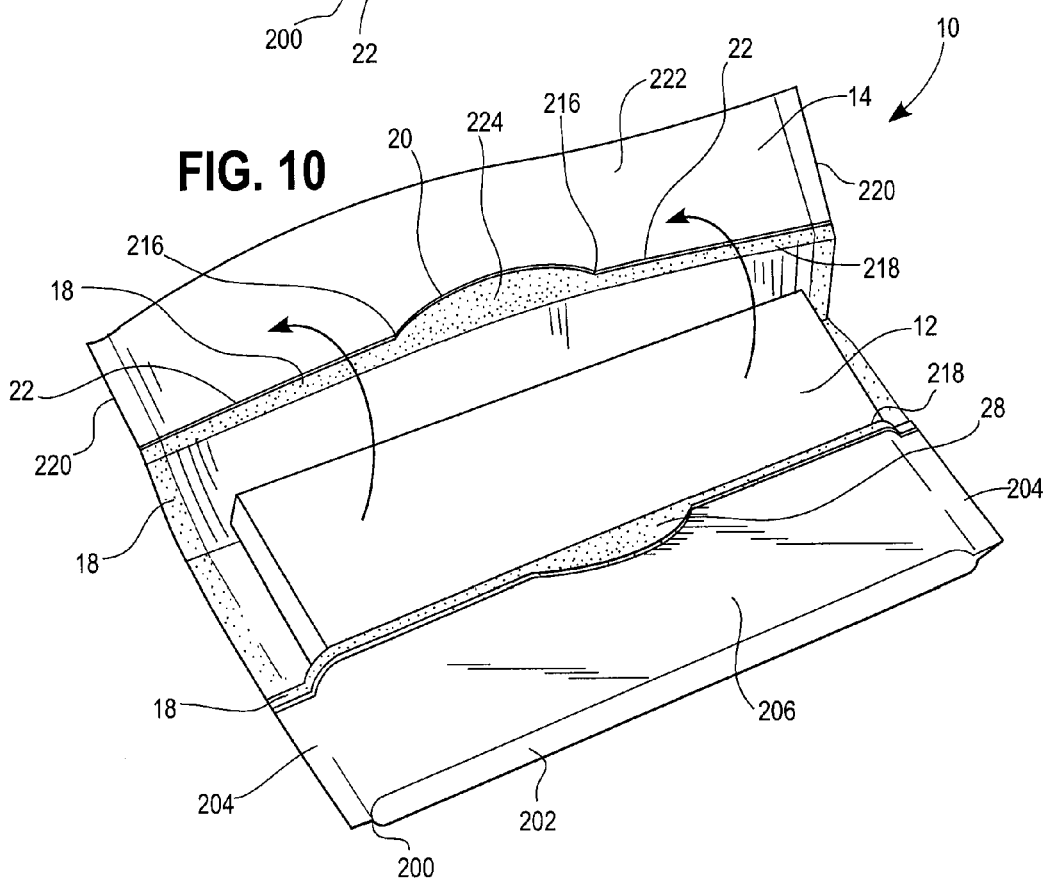

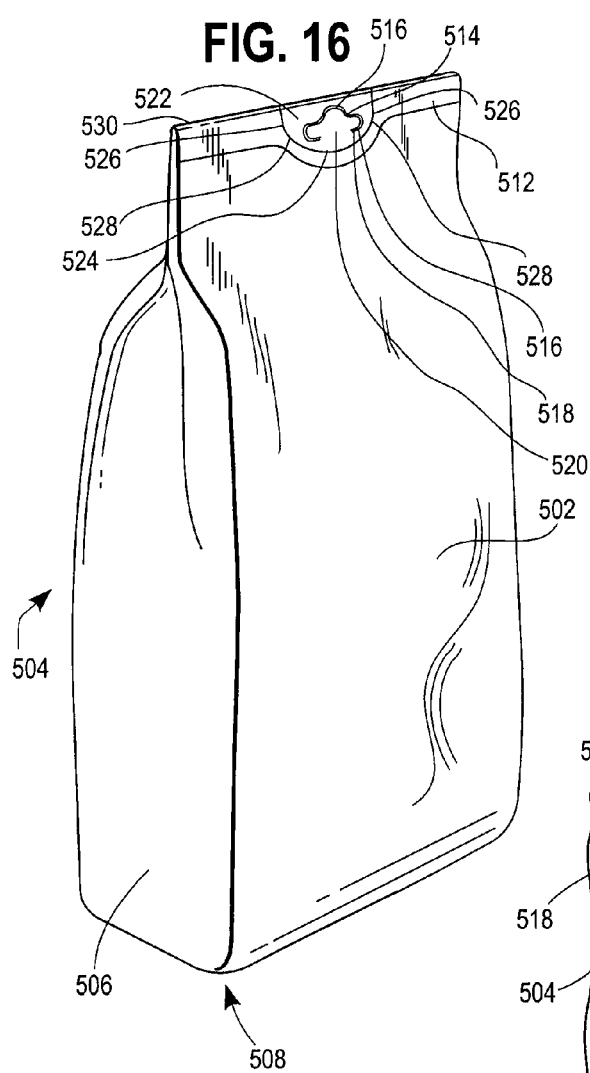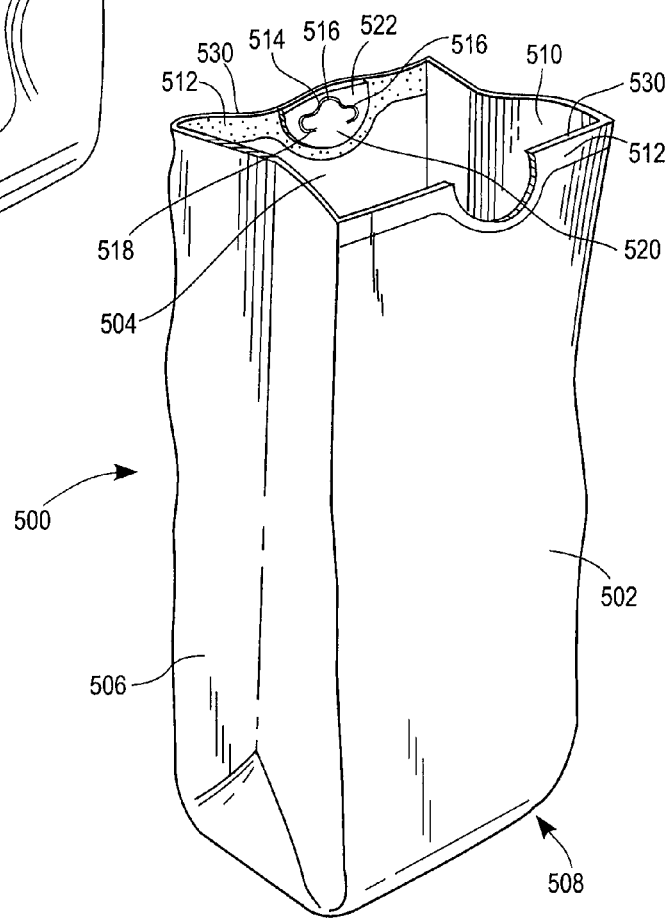

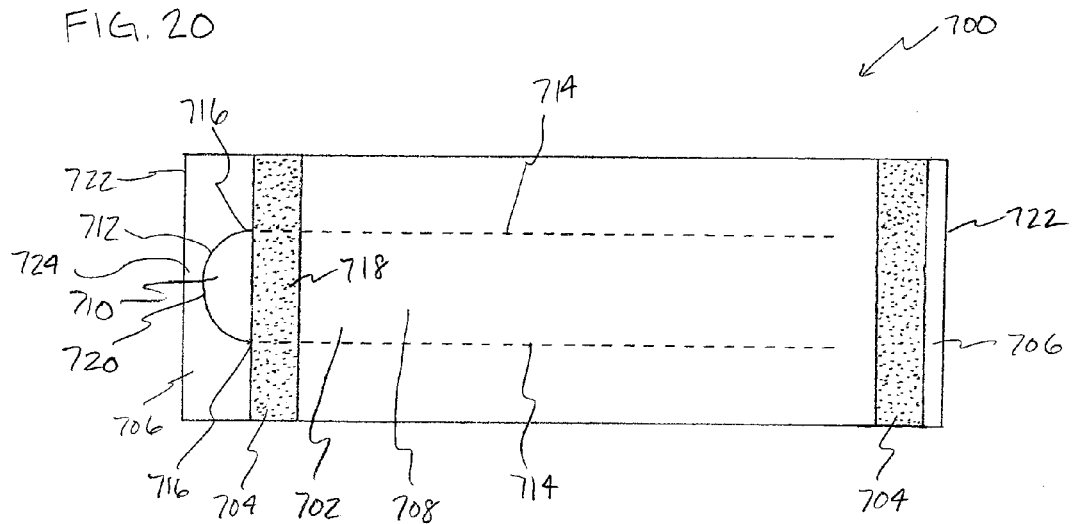
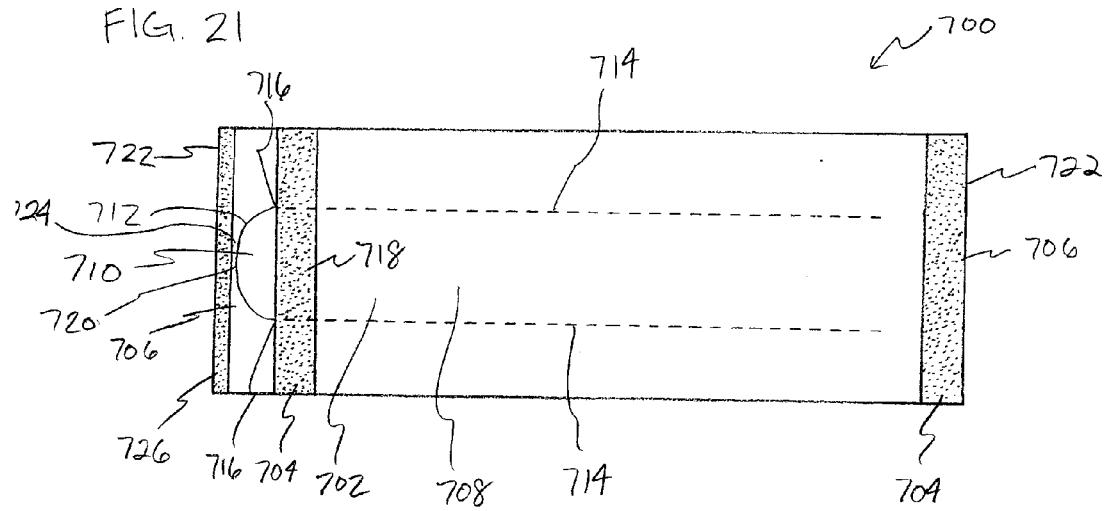
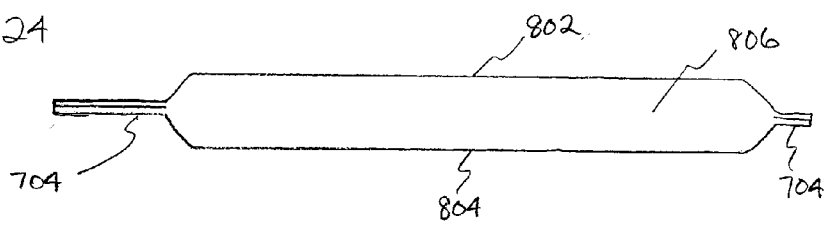

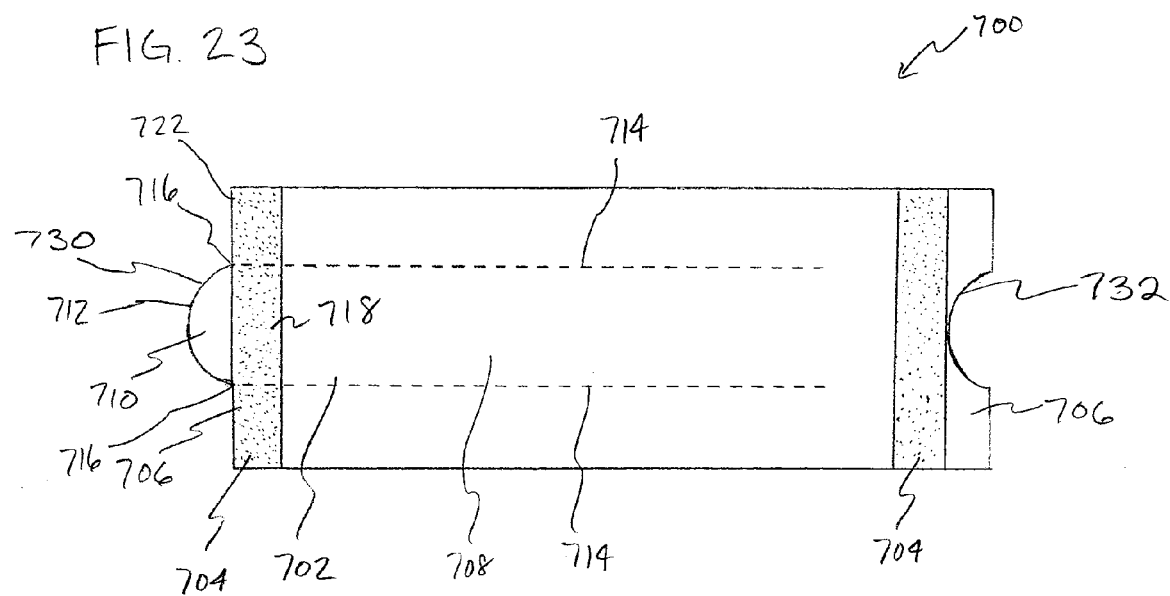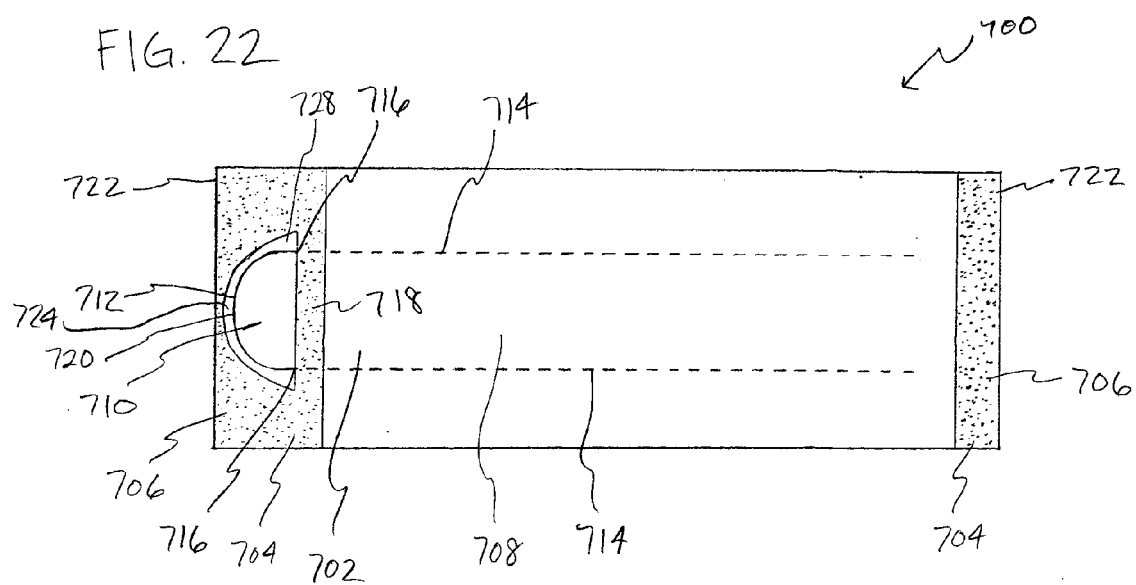

FOOD PACKAGING HAVING OPENING FEATURE

CROSS-REFERENCE TO RELATED APPLICATION

This application is a continuation of U.S. Ser. No. 12/711,133, filed Feb. 23, 2010, which is hereby incorporated by reference herein in its entirety.

FIELD

This disclosure relates to a food package having an opening feature and, in particular, to food package having an opening feature in the form of an integrated, selectively separable flap.

BACKGROUND

A package, such as a package made of flexible material, is commonly used to store a food product during transportation, storage, and during consumption by a user when multiple servings or multiple food products are disposed in the package. A common type of prior package is mass-produced from a web of film material. The web is formed into a continuous tube by sealing the longitudinal edges of the web together to form a fin seal. This continuous tube can then be singulated into smaller packages by forming transverse seals and cutting transversely across the tube in the region of the transverse seals. The food product may be inserted into the tube after the formation of one of the transverse seals and prior to the formation of the opposite transverse seals for a given individual package. Alternatively, the web may be wrapped around the food product prior to the formation of the fin seal.

Such prior packages can initially store the food product within a sealed interior cavity prior to purchase by a consumer. The consumer can then break one of the transverse seals or remove a corner of the package to access the interior cavity and the food product. Neither of these solutions provides a convenient way for consumers to open the package. Further, uncontrolled opening of the package can result in the package being partially or completely unsuitable for reuse, a disadvantage when the package contains multiple servings or multiple food product intended to be consumed over time.

One issue that arises after the initial breaking is how to effectively reclose the package when the package contains multiple servings or multiple food product intended to be consumed over time. As mentioned above, uncontrolled opening of the package can render it unsuitable for reuse and thus also reclose. If a package is provided without a reclose feature, a common practice is to fold the edges of the package over to reduce the headspace above the food product and close the broken seal. A clip can then be applied over the folded material to hold the package in this closed state. This practice, however, often does not sufficiently close the package and if the consumer does not have a clip, the package can unfold and fully expose the food product.

One type of reclose feature provided in the past was to place a zipper strip along one edge of the package. While generally suitable for providing controlled opening and reclose of the package, the increased cost of the package due to the zipper strip can be undesirable for certain packaging applications.

One attempt at providing for controlled opening, described in U.S. Pat. No. 5,470,015, utilizes a U-shaped perforation defining a grip on a free edge of the fin seal. The grip is described as being used to initiate opening of the package. Disadvantageously, no provision is made in the package for controlled opening other than the grip. Thus, the package opens in an uncontrolled manner and suffers from the problems described above. Moreover, no provision is made in the package for reclose.

Another attempt at providing for controlled opening, described in EP1382543, utilizes a perforated line formed in the package that can be broken to form an opening. An adhesive label is applied over the perforated line on the exterior of the package in order to permit the opening to be reclosed by reattaching the label to the exterior portion of the package adjacent the opening. However, the use of the label disadvantageously can increase the cost of the package, as well as add additional material that must be added during manufacturing.

Another type of package includes a hang hole formed or punched in a top seal portion of the package for displaying the package on a peg. The hang hole can be formed using a heated tool, which can lead to the edges of the hole being fused or melted together. While this can increase hanging strength by reinforcing the edges of the hang hole, it can also disadvantageously increase the risk of uncontrolled tear propagation during opening. For example, when sides of the package are gripped and pulled generally apart, pressure can build along the edges of the hang hole. The large amount of force required to break the hang hole can result in an uncontrolled tear across the package. Similarly, the hang hole can be manipulated to start a tear across the package, but this tear can also become uncontrolled for the same reasons. Uncontrolled tears across the package can be unsatisfactory because they can spill the contents of the package and/or leave the package unable to be sufficiently reclosed.

SUMMARY

A package for a food product is provided and includes a fin seal, where the package is configured for controlled opening using an opening feature. More specifically, a flap integrated with the package can be separated from the remainder of the package to permit access to an interior of the package. The flap may be defined at least in part by one or more score or scribed lines that extend only partially through the package, thereby ensuring the integrity of the package while facilitating controlled opening along the score lines. The flap may also be defined at least in part by side seams of the package. In order to facilitate separation of the flap from the remainder of the package, a pull tab or starter portion of the flap may be provided. The pull tab may extend at least partially to the fin seal of the package.

A through cut may define a portion of the pull tab, and can provide a location whereby initial opening of the package can occur. The through cut can advantageously be in an area that does not compromise package integrity, such as in the fin seal or in a flange outward from the fin seal on an opposite side from the interior of the package. The portion of the pull tab immediate adjacent the through cut can be configured to protrude from the adjacent portions of the package, such as by forming a score on the pull tab adjacent to and generally in alignment with the through cut to cause the end of the pull tab to be upturned.

In one aspect, separation of the flap from the remainder of the package may expose an adhesive of the fin seal. The exposed adhesive can advantageously be used for reclosing the package when the flap is pressed thereagainst. In addition or in the alternative, adhesive of opened side seams of the package may be used for reclosing the package, such as by attachment of the flap thereto.

In another aspect, the underside of the flap, facing the interior of the package, can include an adhesive zone extending beyond the adhesive of the fin seal. This adhesive zone can cooperate with the exposed adhesive of the fin seal to permit the flap to be attached to the exposed adhesive of the fin seal in a plurality of different locations. In practice, this means that the flap can be reclosed at progressively shorter distances, thereby decreasing the volume of the interior of the package. When the package contains food product that is meant to be consumed in multiple servings over a period of time, this permits the package to be reclosed in a progressively smaller manner generally corresponding to consumption of the food product.

In another form, the flap may be in the form of a separable part of one of the package walls and that surrounds a hang hole in a sealed portion of a package. The flap includes a through cut formed in the end seal and adjacent an edge of the hang hole. Scribed lines may then extend from end portions of the cut such as in a direction toward an adjacent edge of the package. One or more additional through cuts can also be provided to delineate the flap. So configured, when the package is opened, such as by pulling sides of the package generally apart, the cut initiates a tear along the scribed lines, which direct the tear toward the adjacent edge of the package. The tear can then separate the flap from one side of the package, leaving it sealed against the other side. This advantageously circumvents the hanging portion while the package is opened, providing a controlled tear and a desirable open mouth, which can then subsequently be reclosed.

In yet another form, the flap may be partially formed adjacent an end seal of the package. The flap in this form includes a through cut formed through one layer of the package material in an end seal region of the package adjacent an end edge portion. Scribed lines extend from ends of the cut toward an opposite end edge portion of the package to facilitate opening of the package without compromising the integrity of the package prior to opening. In one aspect, lifting the flap may expose an adhesive of the end seal. The exposed adhesive can advantageously be used for reclosing the package when the flap is pressed thereagainst.

BRIEF DESCRIPTION OF THE DRAWINGS

FIG. 1 is a perspective view of a first embodiment of a recloseable package having a fin seal and showing an opening feature configured for controlled opening including a flap and a pull tab having scribed or scored portions and a cut portion adjacent the pull tab;

FIG. 2 is a partial perspective view of the underside of the portion of the package of FIG. 1 having the opening feature and showing the scribed portions, the cut portion, and adhesive zones;

FIG. 9 is a perspective view of a third embodiment of a package configured for controlled opening and showing an opening feature having scribed portions and a cut portion in a fin seal area;

FIG. 10 is a perspective view of the package of FIG. showing the package in an opened configuration with the scribed portions broken;

FIG. 16 is a perspective view of a fifth embodiment of a food package having an end seal and showing an opening feature configured for controlled opening having scribed portions and a cut portion in the end seal, along with a free edge of the seal, delineating a flap surrounding a hang hole;

FIG. 17 is a perspective view of the package of FIG. showing the package in an opened configuration with the scribed portions broken and the flap being separated from one of the package walls and remaining attached to the other of the package walls;

FIG. 20 is a top plan view of a seventh embodiment;
FIG. 21 is a top plan view of an eighth embodiment;
FIG. 22 is a top plan view of a ninth embodiment;
FIG. 23 is a top plan view of a tenth embodiment; and
FIG. 24 is a side view of the embodiments of FIGS. 20-23.

DETAILED DESCRIPTION

Figure 3:
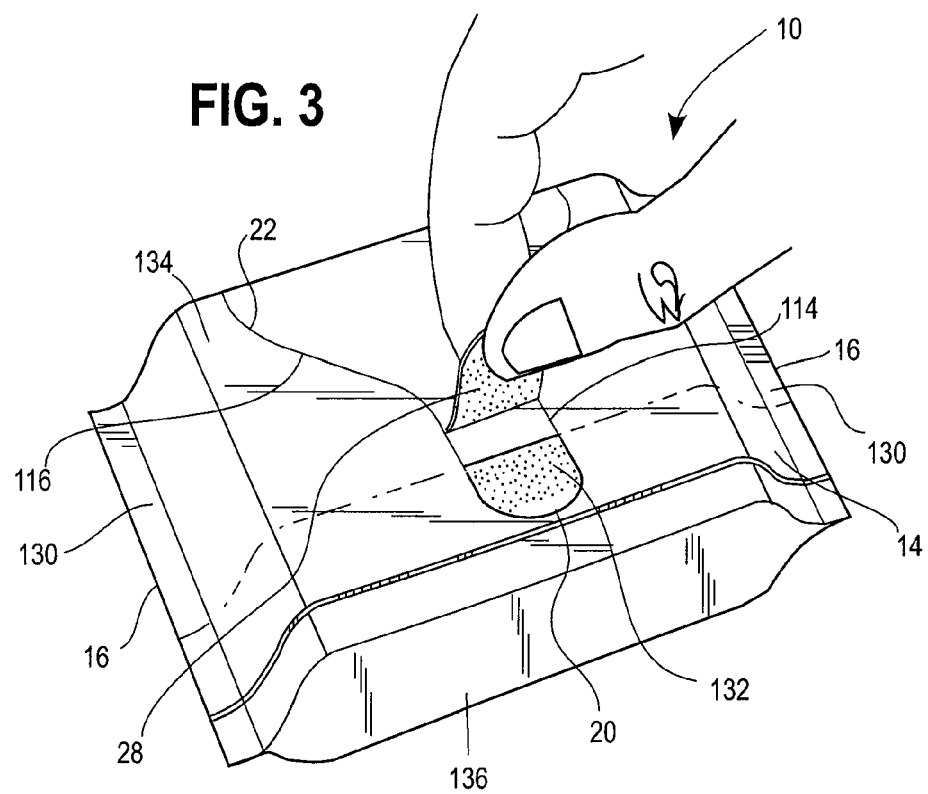
FIG. 3 is a perspective view of the package of FIG. 1 showing the package being opened by peeling the tab from the fin seal and breaking the scribed portions.

Various embodiments of a food package configured for controlled opening using an opening feature are described herein and illustrated in FIGS. 1-15. The exemplary embodiments include a food package containing multiple, individual food products, as illustrated in FIGS. 1-6, 14 and 15. The exemplary embodiments also include food packages configured for a single food product which can be separated into smaller pieces for consumption over time, as illustrated in FIGS. 7-12.

What these packages have in common is a flap that is integral with the package and separable from the remainder of the package in a controlled manner, such as along one or more score or scribed lines extending partially through the package, a through cut, side seams of the package, or combinations thereof. This facilitates opening of the package in a controlled manner, which little if any deviation from the intended path of opening. As the score lines extend partially, as opposed to completely, through the package, the package integrity is not compromised. A portion of the flap is disposed in the area of a fin seal of the package. This advantageously can permit the addition of a through cut to define part of a starter or pull tab that does not compromise package integrity, as well as permit the use of the adhesive already in the fin seal area for optional reclosing of the package.

Turning now to a first exemplary embodiment, illustrated in FIGS. 1-6, a recloseable package 10 is provided to allow a user to reclose the package 10 while a foodstuff 12 is sequentially removed from the package 10. The package 10 includes a fin seal 14 which seals two opposing edge portions 16 utilizing a suitable adhesive 18, such as a cold adhesive. An opening feature 19 is provided in the package 10 which utilizes a cut 20 provided in the fin seal 14 and scribed lines 22 extending from edges of the cut 20. The cut 20 extends through one of the opposing edge portions 16 of the fin seal 14. So configured, a user can grip the fin seal 14 proximate to the cut and pull to separate the opposing edge portions 16 in a region proximate to the cut 20. As the opposing edge portions separate beyond the region proximate to the cut 20, the scribed lines 22 are broken and provide controlled breakage lines to create an opening 24 in the package 10 to an interior cavity. As the scribed lines 22 are broken, a reseal portion 28 of material positioned at least partially within the fin seal is formed. After a subsequent removal of a portion of the foodstuff 12 through the opening 24, the user can reclose the package 10 by replacing the reseal portion 28 to the area in the fin seal 14 where the reseal portion 28 was removed. As a result of utilizing a cold adhesive 18, the reseal portion 28 can readhere to the fin seal 14 to reclose the package 10.

Before the package 10 is formed, the cut 20 and the scribed lines 22 are produced. The cut 20 and the scribed lines can be formed by any suitable mechanism, including, for example, a laser, a rotary die, or a die. The cut 20 and the scribed lines 22 form in part a tab, which is configured to be gripped by a user and peeled away from the fin seal area.

The package 10 can be constructed from a single web 100 of flexible material having opposing end edge portions 102 and opposing side edge portions 104. Before the web 100 is formed into the package 10, the cut 20 and the scribed lines 22 can be formed into the web 100. Further, an adhesive pattern such as illustrated in FIG. 2 can be deposited on the web. As discussed above, the cut 20 and the scribed lines 22 can be formed by any suitable mechanism, including, for example, a laser, a rotary die, or a die. In one example, they are formed using a "firestar t100" laser available from Synrad, Inc. (Mukilteo, Wash.). The scribed lines can have a depth of between about 20% and about 90%, between about 40% and 80%, between about 60% and about 80%, between about 65% and about 75% and preferably about 70% of the thickness of the package film or laminate. For example, for a laminated package film having a total thickness of about 50 microns (0.0020 inches), comprised in an exemplary embodiment of a transparent or clear orientated polypropylene film with a thickness of about 20 microns (0.0008 inches) and a metalized orientated polypropylene film with a thickness of about 30 microns (0.0012 inches), the scribed lines 22 can have a depth of about 35 microns (0.0014 inches). In the case of a laminate film, the scribed lines 22 are preferably in the inner layer, but may also be in the outer layer or extend entirely through one layer and partially into the next layer.

As illustrated, the cut 20 and the scribed lines 22 are configured to preserve package integrity, such as a substantially hermetic seal. The cut 20 is provided within the fin seal 14 which is outside of the sealed area of the package 10. The scribed lines 22 form the remaining portion of the opening feature 19 and do not completely penetrate the web 100, thus preserving the hermetic seal within the package 10.

In the first exemplary form, the cut 20 is convex and positioned within one of the end edge portions 104 which are subsequently used to create the fin seal 14. An apex 106 of the cut 20 is spaced from a side edge 108 by a bridge 110, which may have a width of between about ⅛ inch and about ½ inch. The scribed lines 22 extend from ends 112 of the cut 20. By one approach, the scribed lines 22 include first segments 114 extending from the ends 112 generally transverse to the side edge 108. The cut 20 and at least portions of the first segments 114 combine to form the reseal portion 28, which is configured to be gripped by a user to open the package 10. The first segments 114 extend from the cut 20 for a length of about 20 mm to about 40 mm (about 0.75 inches to about 1.6 inches). The scribed lines 22 also include second segments 116 extending from ends of the first segments 114 opposite the cut 20. The second segments 116 are convex, and extend generally outward from each other, toward the end edge portions 102, respectively, as the second segments 116 travel away from the side edge 108. Third segments 118 are also convex, but extend generally toward each other, away from the end edge portions 102, as the third segments 118 travel away from the side edge 108. The distance between the third segments 118 can be approximately at wide as the foodstuff 12 to facilitate removal of the foodstuff 12 from the package 10. For example, for a foodstuff that has a width of about 87 mm (about 3.4 inches), the distance between the third segments 118 can be about 85 mm (about 3.35 inches). The scribed lines 22 finish with curved elements 120 that direct the scribed lines 22 to finish facing the side edge 108. As illustrated, the curved elements 120 curve tightly inward with a diameter beginning at about 15 mm (about 0.6 inches) and narrowing to about 2 mm (about 0.08 inches), however, larger curved elements or elements with an outward curvature could also be utilized. The curved elements 120 are so configured to provide a stop when the scribed lines 22 are broken.

The reseal portion 28 can further include a biasing line 122 provided adjacent the cut 20. The biasing line 122 is preferably convex and closely adjacent the cut 20. The biasing line 122 in combination with the cut 20 biases a tip 123 of the reseal portion 28 to project above the web 100 to provide easier gripping to a user of the package 10 than if the reseal portion 28 laid flat along with the rest of the web 100. Alternatively, the biasing line 122 may not be a precisely delineated line, but rather the edge of a thermally-treated region of the tip 123 which also results in a bias of the tip 123.

Additionally, before the package is formed, the adhesive 18 may be applied or printed along the edge portions 102, 104 in any pattern suitable to seal the package 10. In this exemplary form, the adhesive 18 includes fin seal adhesive 124 applied within the side edge portions 104 adjacent the side edge 108 and end seal adhesive 126 applied within the end edge portions 102. In the first exemplary form, the fin seal adhesive 124 is spaced from the side edge 108 by a distance of ⅛ inch to 1 inch. The cut 20 can be partially located within this adhesive-free area, which allows the reseal portion 28 to be gripped more easily than if it was entirely adhered. The adhesive 18 can also include tab adhesive 128 applied on a portion or the entire reseal portion 28. The tab adhesive 128 can also extend an area between the second or third segments 116, 118 of the scribed lines 22. This extended area provides additional adhesive to be used during package reclose.

After the cut 20 and the scribed lines 22 are formed in the web 100 and the adhesive 18 is applied, the package 10 is formed. By one approach, the package 10 is formed utilizing vertical form, fill, seal machinery. In this process, the web 100 is formed into a tubular shape by manipulating the web about a longitudinal axis in the feed direction so that the side edge portions 104 generally align. Once aligned, pressure is applied to the side edge portions 104 pressing the fin seal adhesive 124 together to longitudinally seal the package 10 and form the fin seal 14. A similar process is performed on one of the end edge portions 102. Due to the tubular shape, the end edge portions 102 are doubled over. Accordingly, applying pressure along a line transverse to the fin seal 14 on the one of the end edge portions 102 applies pressure to the respective end seal adhesive 126 and seals the one of the end edge portions 102 together to form an end seal 130 and partially form the interior cavity. The other of the end edge portions 102 is left open to receive the foodstuff 12. After the foodstuff is deposited within the interior cavity of the package 10, the other of the end edge portions 102 is then sealed in a similar manner to the one of the end edge portions described above. Alternatively, the package 10 can be formed around the foodstuff, such as within a horizontal form, fill, seal process. In such a process, as the foodstuff 12 is horizontally conveyed, the web 100 is manipulated around the foodstuff 12 and the fin seal 14 is formed, encircling the foodstuff 12 within the formed tubular package. The end seals 130 are then formed and cut on either side of the foodstuff 12 by suitable mechanisms, such as by dies or rotary dies. The combination of the end seals 130 and the fin seal 14 creates a hermetically sealed package 10, which can be utilized to store, transport, and display a foodstuff 12 for sale. Although generally continuous manufacturing processes are described, the processes can be discontinuous, with some of the steps occurring on different equipment or even in different facilities. For example, pre-formed pouches could be produced that can be filled from an open end, which then can be sealed.

As discussed above, the package 10 can be formed as part of a generally continuous manufacturing process utilizing form, fill, and seal machinery, such as vertical or horizontal. This process utilizes a continuous roll of web film, which is then singulated into the individual webs 100 to form the package 10. Due to the various conveyors and feed rolls, torque and tensile force is applied to the web during the process of forming the package 10. As a result of these forces, the bridge 110 separating the side edge 108 from the cut 20 minimizes or prevents these forces from separating the scribed lines 22 at the ends 112 of the cut 20 or otherwise increasing the size of the cut 20. In the illustrated form, as discussed above, the cut 20 is a convex arcuate segment. This advantageously alters the angle that the force, which is applied in the feed direction generally longitudinally along the web 100, acts on the cut 20. A cut made generally transverse to the side edge 108 experiences a normal force during packaging, which maximizes the force felt at the end 112 of the cut 20. In contrast, when the cut is angled or arcuate, the force can be minimized, with a minimum force experienced when the cut is at about a 45 degree angle to the feed direction. Accordingly, a combination of an arcuate or angled cut along with a bridge separating the cut from the side edge of the web 100 minimizes the forces felt on the cut and thus provides protection against the cut 20 spreading and opening the package 10 prior to an intentional opening.

Figure 4:
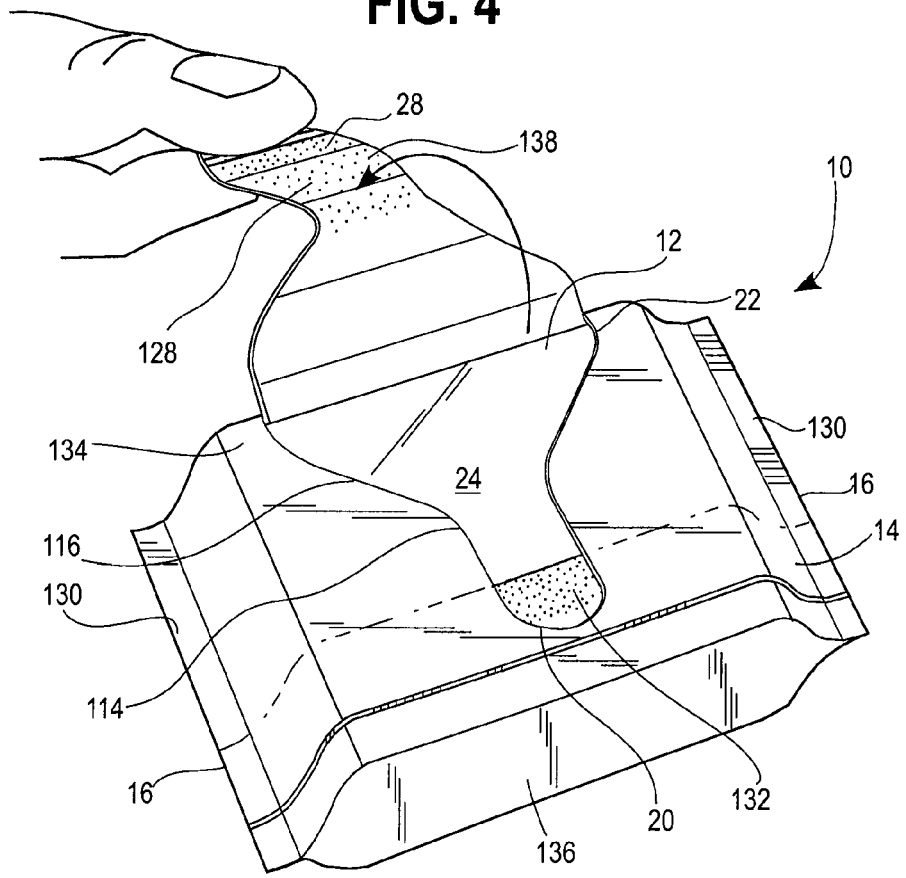
FIG. 4 is a perspective view of the package of FIG. 1 showing the package in an opened configuration with an access opening providing access to an interior of the package.
Figure 5:
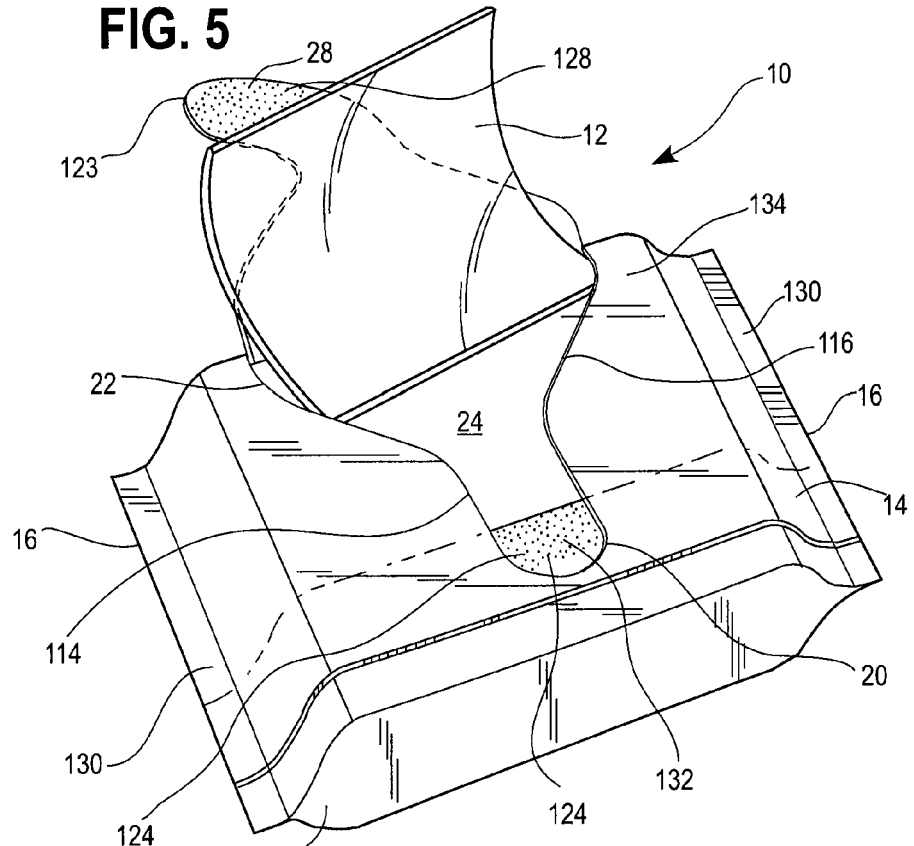
FIG. 5 is a perspective view of the package of FIG. 1 showing the package in the opened configuration and a portion of the food product being removed from the interior of the package.
Figure 6:
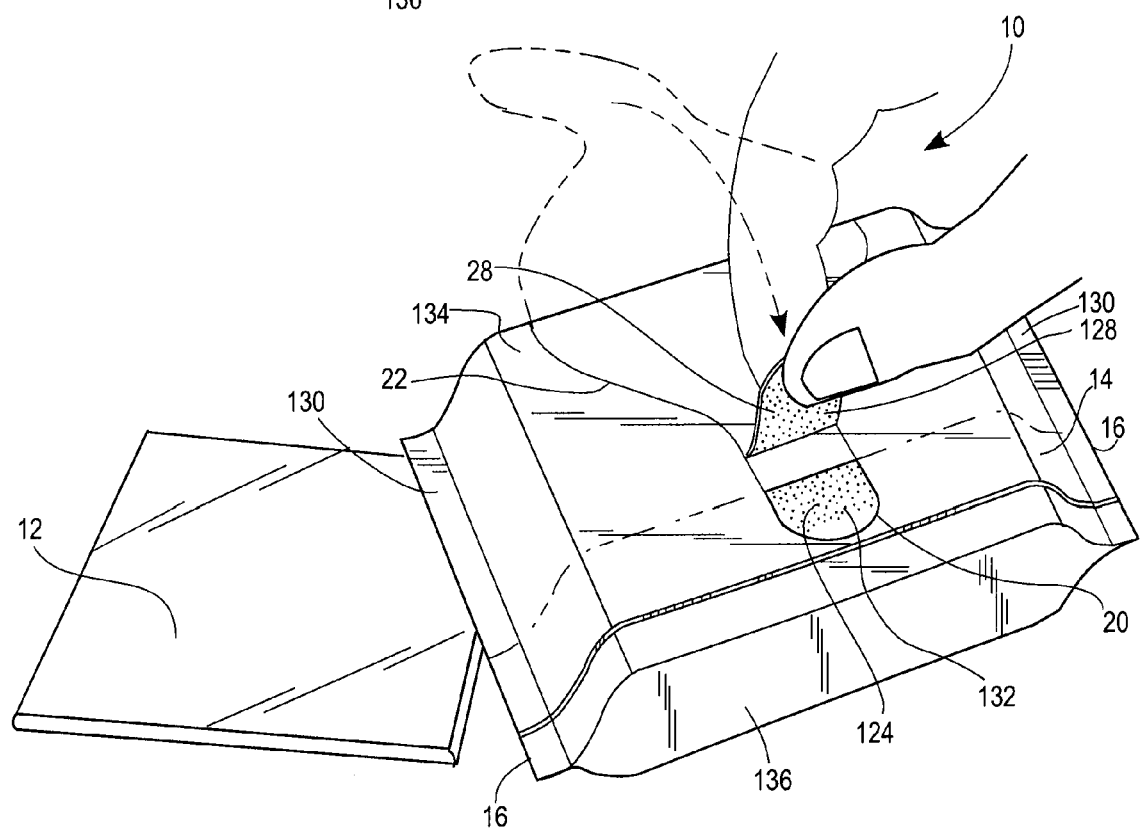
FIG. 6 is a perspective view of the package of FIG. showing the package being reclosed after the removal of a portion of the food product with the tab being realigned with the fin seal.

So formed, the first exemplary package 10 as shown in FIG. 1 can then be utilized to transport, display, and store the foodstuff. Once a portion of the foodstuff 12 is desired, the package 10 can be opened through the opening feature 19. As illustrated in FIGS. 3 and 4, the tip 123 of the reseal portion 28 can be gripped as it protrudes above the package 10. A user then manipulates the reseal portion 28 generally upward and away from the end edge 108. As the reseal portion 28 is pulled, a force is exerted on the scribed lines 22 at the ends 112 of the cut 20. With a sufficient force, the scribed lines 22 will break and guide the opening of the package 10. The reseal portion 28 will then be peeled from the fin seal 14 revealing a replacement section 132. The scribed lines are designed to break during opening of the package 10 to provide the opening 24. As illustrated, the first and second segments 114, 116 are positioned on a top surface 134 of the package 10 and the third segments 118 wrap around to one of the side surfaces 136 of the package 10. Accordingly, as a user breaks the first, second, and third segments 114, 116, 118 the opening 24 is provided on the top surface 134 and side surface 136 of the package 10. A foodstuff 12 or a portion of the foodstuff 12 can then be sequentially removed from the package 10 as shown in FIG. 5. When the desired amount of the foodstuff 12 has been removed, a user can then reclose the package 10 by replacing the reseal portion 28 onto the fin seal 14. The fin seal adhesive 124 still present on the tab 14 and the fin seal 14 allow the tab 14 to be readhered to the fin seal 14 and close the opening 24.

Advantageously, if the tab adhesive 128 is applied outside of the fin seal area, such as on an inward portion 138 as shown in FIG. 2, when replacing the tab 14, a user can replace the inward portion 138 of the tab 14 onto the tab replacement section 132, which reduces the central circumference of the package 10 to more closely conform to the level of the foodstuff 12 remaining in the package 10.

Preferably a cold adhesive, such as a latex-based adhesive coating, is utilized, which has sufficient specifications to allow repeated open and closure of the package 10 without losing enough tack where the reseal portion 28 will not readhere to the fin seal 14. Other types of adhesives can also be used such as hot-melt type adhesives. Suitable types of films include mono or multiple film laminates, such as that discussed hereinabove. Printing may be disposed between the laminate layers.

Referring now to FIGS. 7-12, additional exemplary forms of the package 10 are set forth. The packages 10 of these exemplary forms are constructed from a single web 200 of material and are generally rectangular having opposing side surfaces 202 and opposing end seals 204. The packages 10 further include a top surface 206 bisected by the fin seal 14 extending between the opposing end seals 204. The end seals 204 and the fin seal 14 are formed as described above. The exemplary forms, as shown in FIGS. 7-12, include the opening feature 19, which includes the cut 20 and the scribed lines 22. In contrast to the first exemplary form, however, the cut 20 and the scribed lines 22 are entirely positioned within the fin seal 14. The packages 10 as shown in FIGS. 7-12 undergo similar packaging processes, as described above, to form the cut 20 and the scribed lines 22 in the web 200 and apply the adhesive 18 to the web 200.

Figure 7:
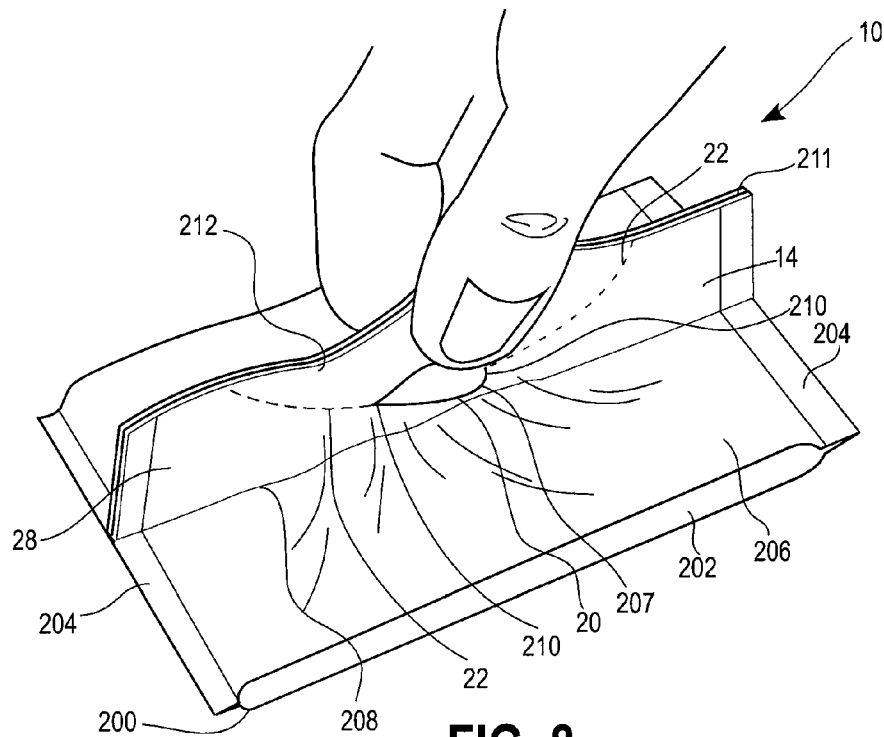
FIG. 7 is a perspective view of a second embodiment of a recloseable package having a fin seal and showing an opening feature configured for controlled opening having scribed portions and a cut portion in a fin seal area.
Figure 8:
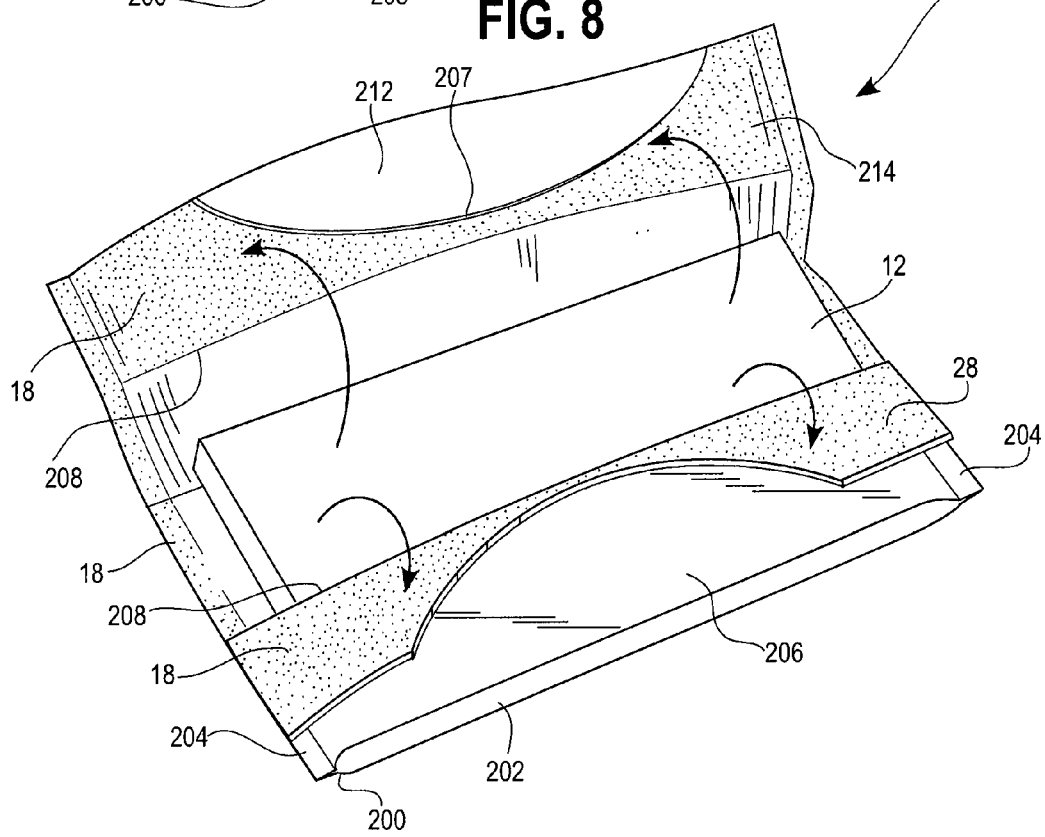
FIG. 8 is a perspective view of the package of FIG. showing the package in an opened configuration with the scribed portions broken.

Referring now to FIGS. 7 and 8, a second exemplary form of the package 10 is provided. The cut 20 is formed generally centered longitudinally on the fin seal 14, however, the cut 20 could also be offset from center. In this form, the cut 20 is generally concave and an apex 207 of the cut 20 is spaced from a fin seal fold 208 by a range of about 2 mm (0.08 inches) to about 6 mm (0.24 inches). The cut 20 extends longitudinally along the fin seal 14 for a length of about 10 mm (0.4 inches) to about 30 mm (1.2 inches). The scribed lines 22 of this form extend from ends 210 of the cut 20 in a convex arc generally complementary to the cut 20 and end at a fin seal edge 211. In combination, the cut 20 and the scribed lines 22 divide one side of the fin seal 14 into a removable portion 212 and the reseal portion 28.

So formed, the second exemplary form of the package 10 as shown in FIGS. 7 and 8 can then be utilized to transport, display, and store the foodstuff. Once a portion of the foodstuff 12 is desired, the package 10 can be opened through the opening feature 19. As illustrated in FIGS. 7 and 8, the removable portion 212 can be gripped, such as by manipulating the fin seal 14 to a position generally perpendicular to the top surface 206 of the package 10. A user then manipulates the removable portion 212 to cause the cut 20 to separate and cause a breaking force on the scribed lines 22, such as by pulling the removable portion 212 or folding the fin seal 14 along the cut 20, or the like. After a sufficient force has been created at the ends 210 of the cut 20, the scribed lines 22 are configured to break along their length to separate the removable portion 212 from the reseal portion 28. This force will also start to peel the reseal portion 28 from the fin seal 14. Once the removable portion 212 is separated, a user can then fully peel the reseal portion 28 from the fin seal 14 opening the top surface 206 of the package 10 and leaving a reseal area 214 where the adhesive 18 is exposed. Optionally, a user can then break half or whole portions of one or both of the end seals 204 to expose the sides of the foodstuff 12. After the desired amount of foodstuff 12 is removed from the package 10, the package 10 is configured to reclose to contain the foodstuff 12 within the package 10. For example, a user can align any end seals broken and align the reseal portion 28 with the reseal area 214 adjacent the removable portion 212 and apply pressure to readhere the adhesive 18 applied to those areas, which effectively recloses the package 10.

Referring now to FIGS. 9 and 10, a third exemplary form of the package 10 is provided. The cut 20 is formed generally centered longitudinally on the fin seal 14, however, the cut 20 could also be offset from center. In this form, the cut 20 is generally convex, ends 216 of which are spaced from a fin seal fold 218 by a range of about 2 mm (0.08 inches) to about 6 mm (0.24 inches). The cut 20 extends longitudinally along the fin seal 14 for a length of about 10 mm (0.4 inches) to about 30 mm (1.2 inches). The scribed lines 22 of this third form extend from the ends 216 of the cut 20 generally parallel to the fin seal fold 218 and end at opposing fin seal side edges 220 respectively. In combination, the cut 20 and the scribed lines 22 divide one side of the fin seal 14 into a removable portion 222 and the reseal portion 28.

So formed, the third exemplary form of the package 10 as shown in FIGS. 9 and 10 can then be utilized to transport, display, and store the foodstuff. Once a portion of the foodstuff 12 is desired, the package 10 can be opened through the opening feature 19. As illustrated in FIGS. 9 and 10, the removable portion 222 can be gripped, such as by manipulating the fin seal 14 to a position generally perpendicular to the top surface 206 of the package 10. A user then manipulates the removable portion 222 to cause the cut 20 to separate and cause a breaking force on the scribed lines 22, such as by pulling the removable portion 222 or folding the fin seal 14 along the cut 20, or the like. After a sufficient force has been created at the ends 216 of the cut 20, the scribed lines 22 are configured to break along their length to separate the removable portion 222 from the reseal portion 28. This force will also start to peel the reseal portion 28 from the fin seal 14.

Once the removable portion 222 is separated, a user can then fully peel the reseal portion 28 from the fin seal 14 opening the top surface 206 of the package 10 and leaving a reseal area 224 where the adhesive 18 is exposed. This provides access to the foodstuff 12 through the top surface 206 of the package 10. Optionally, a user can then break half or whole portions of one or both of the end seals 204 to expose the sides of the foodstuff 12. After the desired amount of foodstuff 12 is removed from the package 10, the package 10 is configured to reclose to contain the foodstuff 12 within the package 10. For example, a user can align any end seals broken and align the reseal portion 28 to its position adjacent the removable portion 222 with the reseal area 224 adjacent the removable portion 222 and apply pressure to readhere the adhesive 18 applied to those areas, which effectively recloses the package 10.

Figure 11:
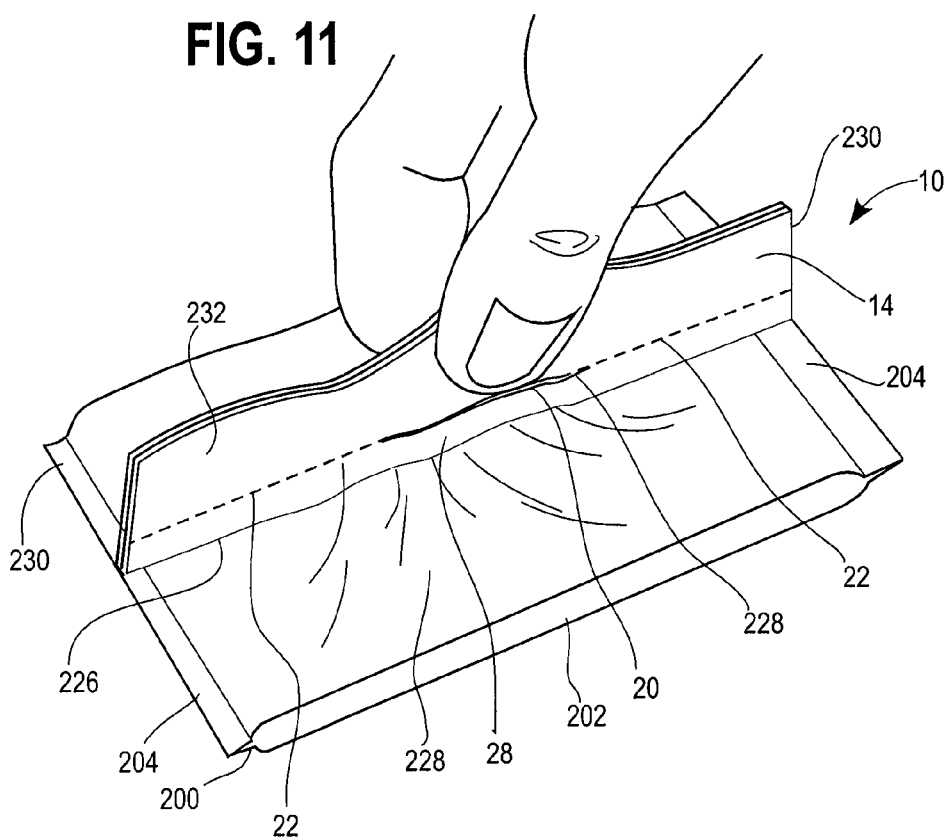
FIG. 11 is a perspective view of a fourth embodiment of a package configured for controlled opening and showing an opening feature having scribed portions and a cut portion in a fin seal area.
Figure 12:
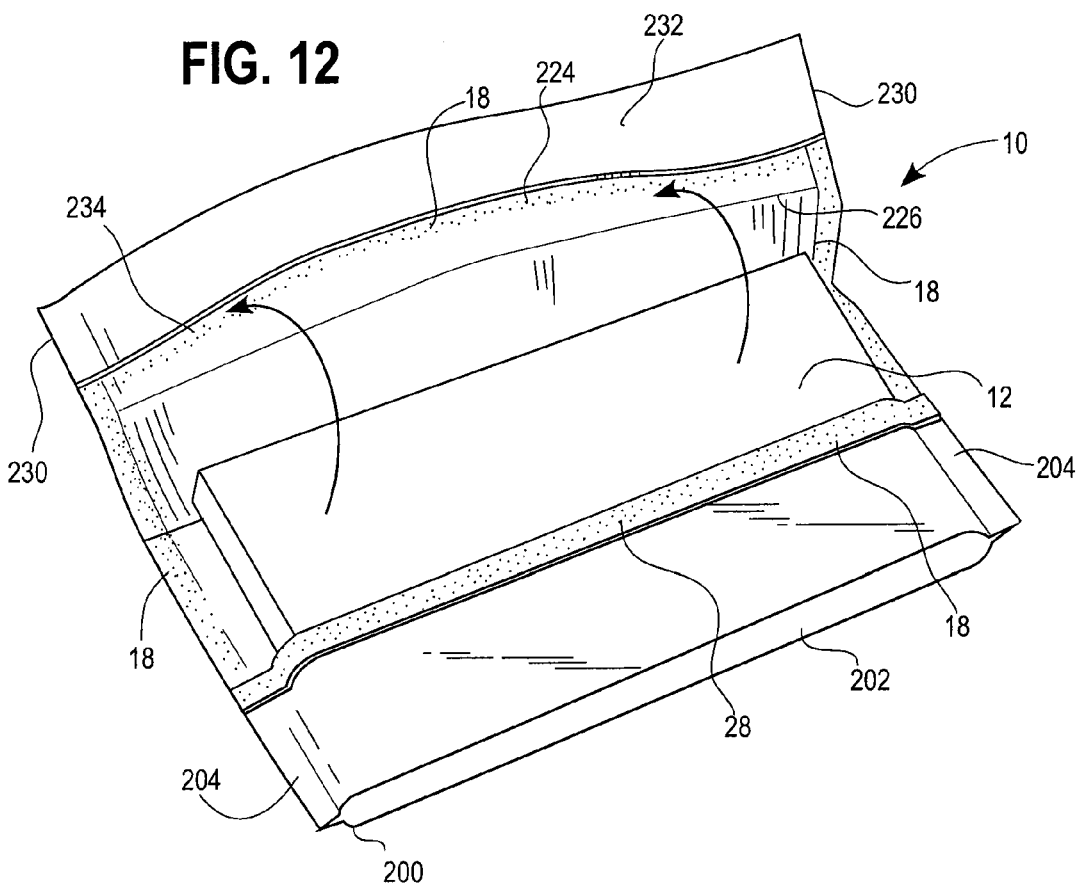
FIG. 12 is a perspective view of the package of FIG. showing the package in an opened configuration with the scribed portions broken.
Figure 13:
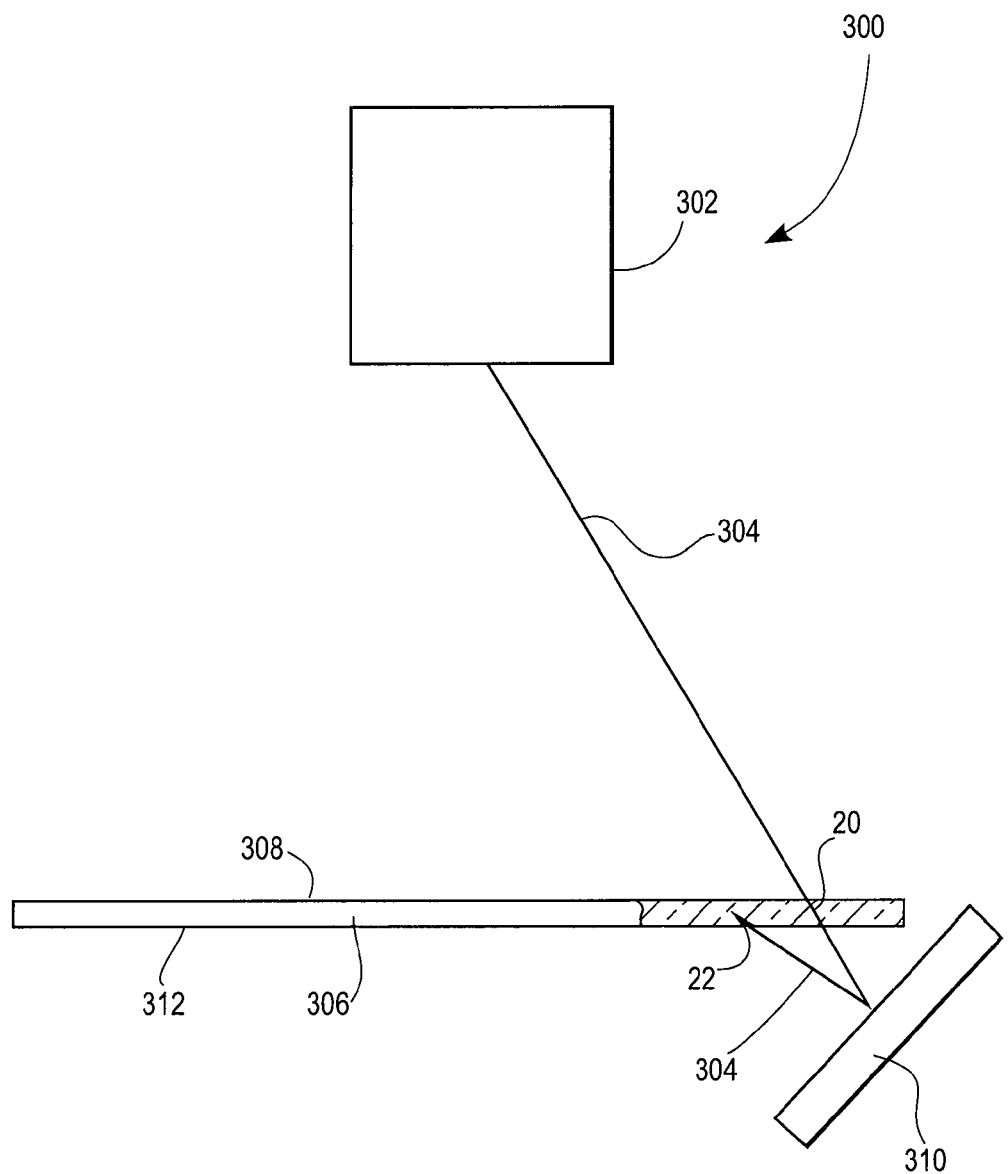
FIG. 13 is a schematic diagram of an apparatus for forming a cut and a scribe using a single laser.

Referring now to FIGS. 11 and 12, a fourth exemplary form of the package 10 is provided. The cut 20 is formed generally centered longitudinally on the fin seal 14, however, the cut 20 could also be offset from center. In this form, the cut 20 is a generally straight line spaced from and generally parallel to a fin seal fold 226, such as by a range of about 2 mm (0.08 inches) to about 6 mm (0.24 inches). The cut 20 extends longitudinally along the fin seal 14 for a length of about 10 mm (0.4 inches) to about 30 mm (1.2 inches). The scribed lines 22 of this fourth form extend from ends 228 of the cut 20 also generally parallel to the fin seal fold 226 and end at opposing fin seal side edges 230 respectively. In combination, the cut 20 and the scribed lines 22 divide one side of the fin seal 14 into a removable portion 232 and the reseal portion 28.

So formed, the fourth exemplary form of the package 10 as shown in FIGS. 11 and 12 can then be utilized to transport, display, and store the foodstuff. Once a portion of the foodstuff 12 is desired, the package 10 can be opened through the opening feature 19. As illustrated in FIGS. 11 and 12, the removable portion 232 can be gripped, such as by manipulating the fin seal 14 to a position generally perpendicular to the top surface 206 of the package 10. A user then manipulates the removable portion 232 to cause the cut 20 to separate and cause a breaking force on the scribed lines 22, such as by pulling the removable portion 232 or folding the fin seal 14 along the cut 20, or the like. After a sufficient force has been created at the ends 228 of the cut 20, the scribed lines 22 are configured to break along their length to separate the removable portion 232 from the reseal portion 28. This force will also start to peel the reseal portion 28 from the fin seal 14. Once the removable portion 232 is separated, a user can then fully peel the reseal portion 28 from the fin seal 14 opening the top surface 206 of the package 10 and leaving a reseal area 234 where the adhesive 18 is exposed. This provides access to the foodstuff 12 through the top surface 206 of the package 10. Optionally, a user can then break half or whole portions of one or both of the end seals 204 to expose the sides of the foodstuff 12. After the desired amount of foodstuff 12 is removed from the package 10, the package 10 is configured to reclose to contain the foodstuff 12 within the package 10. For example, a user can align any end seals broken and align the reseal portion 28 with the reseal area 234 adjacent the removable portion 232 and apply pressure to readhere the adhesive 18 applied to those areas, which effectively recloses the package 10.

By one approach, the cut 20, scribed lines 22 and biasing line 122 can be formed through the use of a laser cutting system 300 utilizing a laser cutting head 302 which emits a laser beam 304. The laser beam 304 can be configured to both cut and score the film using a single beam 304, or separate cuts and scores of the film can be made using multiple beams. For example, the laser beam 304 can create both the cut 20 and the biasing line 122. This is achieved, in one form, by positioning the laser cutting head 302 on one side of packaging material 306, such as a side that forms an interior 308 of the package 10. So positioned, the laser beam 304 first cuts through the packaging material 306 to create the cut 20. After the laser beam 304 passes through the packaging material 306, a mirror 310 or the like positioned on the other side of the packaging material, such as a side that forms an exterior 312 of the package 10, deflects the laser beam 304 and redirects the laser beam 304 to impact the exterior 312 of the package 10 and create the biasing line 122. The power of laser beam 304 is configured to initially cut through the packaging material 306, but to score the packaging material 306 after being redirected by the mirror 310. Depending upon the amount of distortion of the laser beam 304 after forming the cut 20, a precisely delineated biasing line 122 may not result, but rather a localized thermal treatment of the tip 123 may result, both with and without ablation. The thermal treatment can cause shrinkage of the film, thereby resulting in the tip 123 protruding toward the side of the film where the thermal treatment is applied. By another approach, beam splitters, multiple lasers, or a combination could be utilized. The laser beam 304 for making any of the aforementioned cuts or scores can be focused in a precise position of the film to maximize power concentration at a localized point or region in order to treat the film, where treating can include ablation, thermal treatment, or the like to differentiate the localized point or region from adjacent portions of the film. A smaller focus can increase the power concentration, thereby facilitating both a thinner score line and faster scribing speed.

Figure 14:
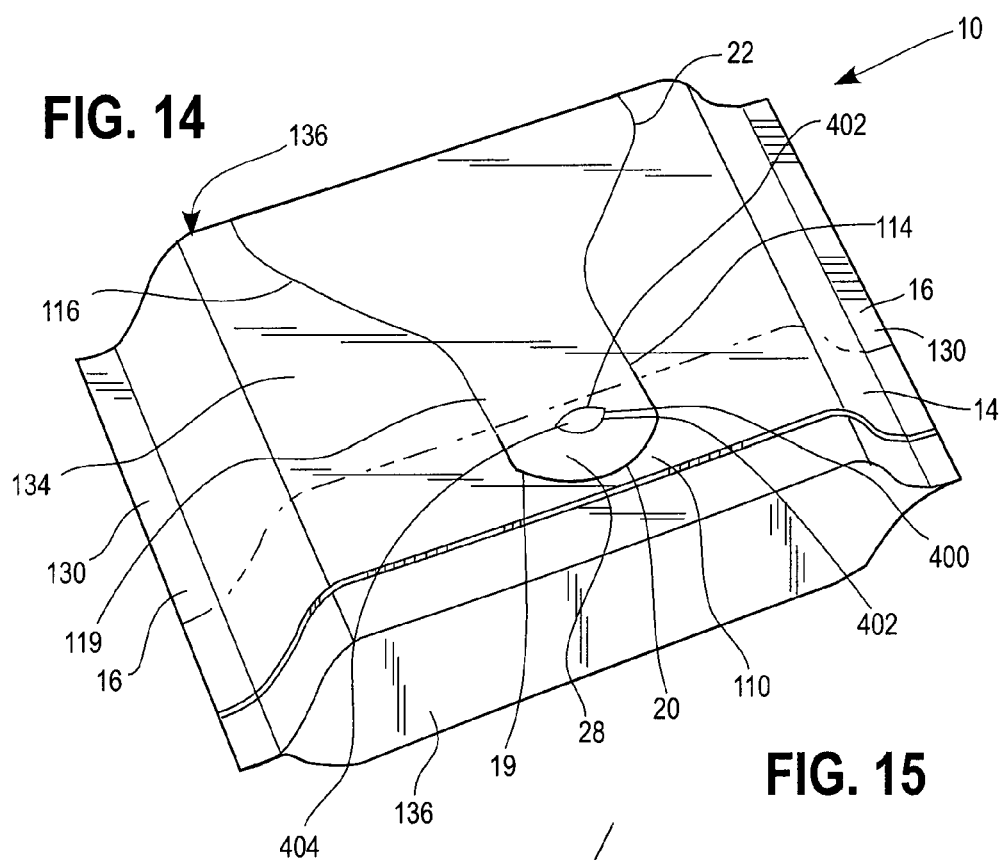
FIG. 14 is a perspective view of a recloseable food package similar to that of FIG. 1 and in an unopened configuration, but having a package integrity feature in the pull tab region.
Figure 15:
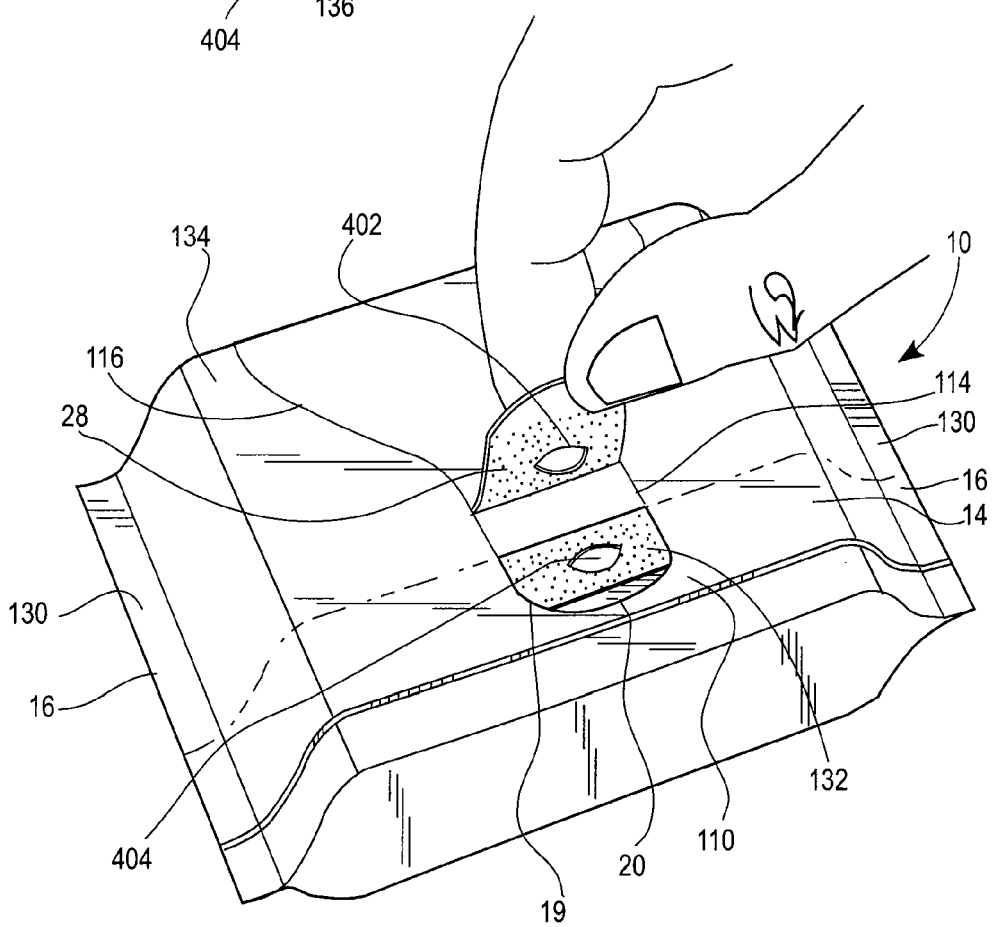
FIG. 15 is a perspective view of the recloseable food package of FIG. 14, showing the package in an open configuration with the package integrity feature indicating that the package has been initially opened.

Referring now to FIGS. 14-15, the package 10 can optionally be provided with an example integrity feature 400. The package integrity feature 400 can be configured to visually display to a viewer if a package has previously been opened. As illustrated, the integrity feature 400 includes a pair of lines 402 forming a removable portion 404. The lines 402 may be scribed, cut, perforated, or the like and can be formed by any suitable mechanism, such as by a laser(s), a die, a rotary die, or the like. Additionally, as illustrated, the removable portion 404 is formed with two opposing arcuate lines, however, any suitable closed general shape can be utilized, including, for example, curvilinear shapes, such as oval, circular, elliptical, or other combination of arcuate lines, shapes with linear sides, such as triangular, quadrilateral, or other regular or irregular polygons, or a combination thereof. Additionally, a closed general shape is considered to include shapes with perforated lines, material breaks between lines, or the like. Further, the package integrity feature 400 is shown with one removable portion 404, however, any number of removable portions 404 can be utilized and such removable portions may or may not be similarly shaped.

The package integrity feature 400 can be formed in the web of material 100 either before or after forming the package 10. After the package 10 is formed, the package integrity feature 400 shows a uniform appearance, as shown in FIG. 14, where the lines 402 are unbroken or substantially aligned. As the package 10 is opened, however, the lines 402, if scribed, break as the reseal portion 28 is pulled away from the package 10. This process leaves the removable portion 404 attached to the tab replacement section 132. Accordingly, if the reseal portion 28 is attempted to be replaced, the removable portion 404 will likely display an irregularity, such as unaligned/broken lines, indicating that the package 10 has been opened. This feature is particularly advantageous when the package 10 is used to store the foodstuff 12 and offered for sale. A consumer can use the package integrity feature 400 as one method to determine whether the package 10 has been opened or otherwise tampered with.

Referring now to FIGS. 16 and 17, a fifth exemplary form of the package 10 is provided. In this form, a package 500 includes front and back wall portions 502, 504 connected by side wall portions 506. The package 500 includes a sealed bottom wall 508 opposite from a mouth 510 through which the package 500 can be filled. After contents, such as a food product, have been deposited into the package 10, the mouth 510 can be sealed to form a top seal 512. Any suitable sealing process can be utilized, such as a hot sealing, a cold sealing, or an induction sealing process.

As described above, a common merchandising display includes hanging a package from a peg projecting from a display shelving unit. To achieve this, a hang hole 514 is formed in the package 500. This can be accomplished by, for example, using a hot tool, which punches the desired hang hole shape into the top seal 512. As illustrated in FIG. 16, the hang hole 514 includes an open shape with three semi-circular elements 516 at right angles, two projecting generally outward and one projecting generally upward, and a generally collinear bottom edge 518 having a break 520 therein. Other suitable open and closed hang hole shapes can also be utilized, such as a simple hole. The forming of the hang hole 514 can result in a reinforced area at least partially surrounding the hole 514.

An opening feature including a separable flap 522 is provided adjacent the hang hole 514 to facilitate controlled opening of the package 500 without substantial interference from the hang hole 514, and preferably the flap 522 at least partially surrounds the hang hole. The flap 522 includes a through cut 524 provided adjacent and below the bottom edge 518 of the hang hole 514, but still within the top seal 512 so a sealed interior of the package 500 is not compromised until the package 500 is opened. Scribed lines 526 project from end portions 528 of the cut 524, such that the scribed lines 526 project to areas adjacent the outwardly projecting elements 516. As illustrated, the scribed lines 526 extend to a top edge 530 of the package 500, however, the scribed lines 526 may end spaced a predetermined distance from the top edge 530. Preferably, the cut 524 and the scribed lines 526 are formed in the package 500 prior to assembly of the package 500 and the hang hole 514 is formed therein after assembly or during the formation of the seal.

So configured, the package 500 is sealed to store a food product therein during transportation, storage, and display.

During subsequent opening of the package 500, the front and back wall portions 502, 504 can be gripped and pulled generally away from each other. As the seal in the top seal 512 adjacent the cut 524 is broken, the cut 524 begins to separate focusing the tear force on the end portions 528. This causes the scribed lines 526 to separate along their length. The scribed lines 526 direct the separation to the top edge 530 of the package 500. When the separation reaches the top edge 530, the flap 522 is separated from the front wall 502 of the package 500 and remains sealed to the back wall 504. The remaining seal areas of the top seal 512 on either side of the flap 522 can subsequently or at the same time separate to fully open the mouth 510 of the package 500 in a controlled fashion by avoiding separation through the region of the hang hole 514.

Figure 18:
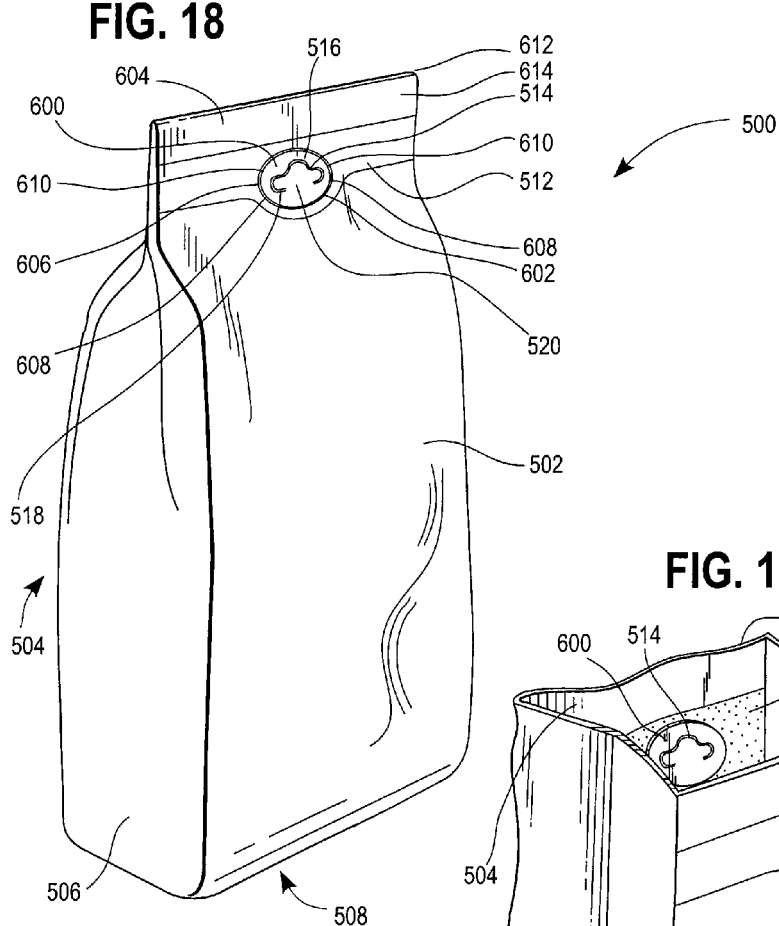
FIG. 18 is a perspective view of a sixth embodiment of a food package having an end seal and showing an opening feature configured for controlled opening having scribed portions and a pair of cut portions in the end seal delineating a flap surrounding a hang hole.
Figure 19:
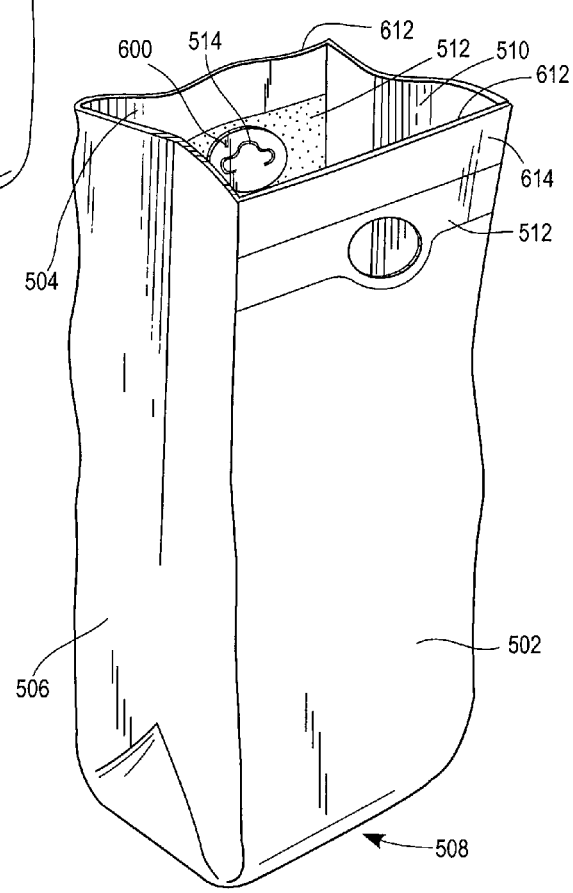
FIG. 19 is a perspective view of the package of FIG. showing the package in an opened configuration with the scribed portions broken and the flap being separated from one of the package walls and remaining attached to the other of the package walls.

Referring now to the sixth exemplary embodiment of FIG. 18, the package 500 is provided with a similar form of opening feature as illustrated in FIG. 16 including a flap 600 in the top seal 512. As illustrated, the flap 600 includes a first through cut 602 adjacent and below the hang hole 514. In this form, the flap 600 also includes a second through cut 604 adjacent and above the hang hole 514. Scribed lines 606 connect end portions 608, 610 of the first and second cut 602, 604 to form a generally closed shape to generally surround the hang hole 514, where generally surround includes perforations, scribes, scores, breaks, and the like. In this form, the flap 600 is spaced from a top edge 612 of the package 500. A flange 614 is positioned between the top seal 512 and the top edge 612, which can be unsealed to provide an alternative gripping area for a user to open the package 500. As illustrated, the flap 600 is generally oval, however, any suitable generally closed shape could be utilized, where generally closed includes perforations, cuts, line breaks, or the like. So configured, the scribed lines 606 separate during opening, either by pulling the front and back wall portions 502, 504 apart or separating the flange 612, to connect the first and second cuts 602, 604 to separate the flap 600 from the front wall 502 of the package 500 and allow controlled opening of the package by bypassing the hang hole 514. The flap 600 is configured to remain sealed to the back wall portion 504 of the package 500 while the remaining areas of the top seal 512 separate.

The flap 522, 600 can also be utilized as a package integrity feature. As discussed, once the scribed lines 526, 606 have been broken and the flap 522, 600 is separated from the front wall 502. Accordingly, if the package 500 is attempted to be reclosed by resealing the top seal 512, the opening feature 522 will likely display an irregularity, such as unaligned/broken lines, indicating that the package 500 has been opened.

In both of the embodiments of FIGS. 16-19, the through cuts extend roughly parallel to the directions that the walls are pulled toward during opening of the package. Advantageously, the positioning of the cuts in these orientations, instead of scribed lines, can reduce the propensity for deviation in these locations during opening by providing a path of low resistance for shear forces. However, scribed lines could also be used in lieu of the cuts.

By one approach, the cut and scribed lines discussed herein can be formed in-line with the package assembly process. In an off-line process, the cut and scribed lines would be formed prior to assembly of the package. For example, material is unwound from a spool, cut and scribed, and then rewound to the spool. This pre-cut and pre-scribed material can then be stored and/or shipped to be subsequently run through the package assembly process. While this is satisfactory for many purposes, raised sections of the material due to treatment during the cutting and scribing process can emboss or imprint adjacent portions of material with ridges or bumps when the material is tightly rewound about the spool. This can disadvantageously affect the visual appeal of the package. Creating the cut and scribed lines in-line with the package assembly process avoids this because the material is not respooled prior to package assembly. Additionally, material tears during unspooling of pre-cut and pre-scribed material are also avoided. A further advantage of an in-line process is that the cut and scribed lines can be monitored for quality control purposes. This can prevent reliance on the quality control of third parties and can also prevent waste by providing an efficient opportunity to stop the flow of material when a problem occurs.

Turning now to additional exemplary embodiments, illustrated in FIGS. 20-24, a package 700 is shown that provides a user with a controlled opening feature 702 to open the package 700 to remove a foodstuff 12. The package 700 may further be recloseable to allow a user to sequentially remove portions of the foodstuff 12 and reclose the package 700 between uses. As shown in FIG. 24, the package 700 includes top and bottom walls 802, 804 connected by side walls 806 to form an interior of the package 700. The top and bottom walls 802, 804 are sealed together utilizing a suitable adhesive, such as a cold adhesive as discussed above, at opposing end seals 704 positioned within opposing edge portions 706. The opening feature 702 utilizes a flap 708 having a pull tab 710 formed by a cut 712 provided in and/or adjacent one of the end seals 704 and scribed lines 714 extending from end portions 716 of the cut 710. Preferably, and as illustrated, the scribed lines 714 extend from the end portions 716 of the cut 12 at least partially through the end seal 704 in a generally parallel orientation along the top wall 802 of the package 700 and terminate short of the other end seal 704 by about ¼ inch to about 1 inch. This helps to prevent accidental removal of the flap 708 from the package 700. As an additional feature that may help to prevent accidental removal, the scribed lines 714 may have hooked ends. The flap 708, however, can of course be completely removed by a user if desired.

So configured, a user can grip the pull tab 710 proximate to the cut 712 and pull to separate the opposing edge portions 706 proximate to the cut 712. As the opposing edge portions 706 separate beyond the region proximate to the cut 712, the scribed lines 714 are broken, i.e., the package wall is parted along the scribed lines 714, and the scribed lines 714 provide controlled breakage lines to create an opening in the package 700 to provide access to an interior cavity. As the scribed lines 714 are broken, a reseal portion 718 of the end seal 704 located on the top wall 802 is exposed as the top wall 802 is separated from the bottom wall 804. After a subsequent removal of a portion of the foodstuff 12 through the opening, the user can reclose the package 700 by replacing the reseal portion 718 within the end seal 704 and applying pressure to the top and bottom walls 802, 804. As a result of utilizing a cold adhesive, as described above, the reseal portion 718 can readhere to the end seal 704 to reclose the package 700.

The cut 712 and the scribed lines 714 are preferably configured to preserve package integrity, such that the package may be substantially hermetically sealed. The cut 712 is provided within or outwardly of the end seal 704 which is outside of the sealed area of the package 700. The scribed lines 714 form the remaining portion of the opening feature 702 and do not completely penetrate the web, thus preserving the hermetic seal within the package 700.

As discussed above, the package 700 can be formed as part of a generally continuous manufacturing process utilizing vertical or horizontal form, fill, and seal machinery. This process preferably utilizes a continuous web of film. Before the package 700 is formed, the cut 712 and the scribed lines 714 are formed by a laser, a rotary die or other die, or another suitable mechanism. The package 10 can further be made from a single web of flexible material, as described above.

To open the package, a user manipulates the pull tab 710 to pull reseal portion 718 generally upward and away from the end seal 704 portion of the bottom wall 804. As the reseal portion 718 is pulled, a force is exerted on the scribed lines 714 at the ends 716 of the cut 712. With a sufficient force, the scribed lines 714 will break and guide the opening of the package 700. The reseal portion 718 will then be peeled from the end seal 704 portion of the bottom wall 804 revealing a replacement section into which the reseal portion 718 can be readhered. Each of the embodiments of FIGS. 20-23 can be used individually, in any combination, or combined with any of the previously described embodiments.

In the embodiment illustrated in FIG. 20, the cut 712 is convex and positioned at least partially outwardly of and adjacent to one of the end seals 704 within the edge portion 706. An apex 720 of the cut 712 is spaced from an end edge 722 by a bridge 724, which may have a width of between about ⅛ inch and about ½ inch. The scribed lines 714 may extend from the ends 716 of the cut 712 in a direction generally toward the other of the end seals 704 and preferably in a generally parallel direction. Additionally, before the package is formed, the adhesive may be applied or printed along the edge portions 706 in any pattern suitable to seal the package 700. In this exemplary form, the adhesive is spaced from the end edges 722. This space is utilized on one side to at least partially form the pull tab 710 so that the pull tab 710 is formed within the adhesive-free area and can be gripped by a user to more easily open the package 700.

In the embodiment illustrated in FIG. 21, the cut 712 is convex and positioned at least partially outwardly of and adjacent to one of the end seals 704 within the edge portion 706. This embodiment is substantially similar to that of FIG. except that an additional transverse seal 726 is formed outwardly of and adjacent to the pull tab 710. So formed, the pull tab 710 is at least partially positioned between the transverse seal 726 and the end seal 704. Additionally, the other end seal 704 is not spaced from the end edge 722. As illustrated, the end edges 722 of the package 700 are sealed, which advantageously substantially prevents unwanted separation of the end seals 704.

In the embodiment illustrated in FIG. 22, the cut 712 is convex and positioned within an end seal 704. In this form, an adhesive-free area 728 is formed within one of the end seals 704 that at least partially encloses or surrounds the pull tab 710, so that the pull tab 710 can be more easily manipulated away from the end portion 706 and gripped by a user. As illustrated, the adhesive-free area 728 is generally complementary to the convex shape of the cut 712, however, other suitable shapes can be utilized.

In the embodiment illustrated in FIG. 23, the cut 712 is convex. In this form, the cut 712 partially forms one of the end edges 722 of the package 700. Accordingly, the scribed lines 714 extend from the end portions 716 of the cut 712 which are at or proximate to the end edge 722. Additionally, because the package 700 can be formed as discussed above, the forward end edge 722 including the cut 712 is used to separate adjacent packages 700. Therefore, forming the pull tab 810 at a forward end 730 of the package 700 entails cutting the pull tab from the top wall 802 or both the top and bottom walls 802, 804 of a trailing end 732 of a forwardly positioned package 700 in the process feed direction. This configuration provides a user with an easily manipulated pull tab 710 to open the package 700.

The drawings and the foregoing descriptions are not intended to represent the only forms of the package in regard to the details of construction. Changes in form and in proportion of parts, as well as the substitution of equivalents, are contemplated as circumstances may suggest or render expedient.

The invention claimed is:

1. A flexible package having a sealed interior, the package comprising:
    opposed front and back wall portions of flexible material having top edges;
    a top seal extending laterally across and at least partially sealing the front and back wall portions together adjacent to the top edges thereof;
    a hanging feature in the top seal having reinforced edges relative to the top seal extending through the front and back wall portions; and
    a line of weakness extending along the front wall portion within the top seal thereof, at least partially below the hanging feature, and upwardly laterally adjacent to sides of the hanging feature;
    wherein the front and back wall portions are configured to be gripped below the top seal and pulled generally apart to separate the top seal and the line of weakness is configured to separate and direct opening around the hanging feature so that a tab portion of the front wall portion including the hanging feature remains sealed to the back wall portion after opening.

2. The package of claim 1 wherein the line of weakness intersects the top edge of the front wall portion.

3. The package of claim 1 wherein the line of weakness encircles the hanging feature.

4. The package of claim 1 wherein a portion of the line of weakness below the hanging feature comprises a through cut and portions of the line of weakness laterally adjacent to the sides of the hanging feature comprise scribed lines.

5. The package of claim 1 wherein the top seal is a cold seal using a resealable adhesive so that the top seal can be reclosed after opening.

6. The package of claim 1 wherein the tab portion acts as a tamper evident feature.

7. The package of claim 1 wherein the top seal extends to the top edges of the front and back wall portions.

8. The package of claim 1 wherein the top seal is spaced from the top edges of the front and back wall portions.

9. A method of opening the package of claim 1, the method comprising:
    gripping the front and back wall portions of the flexible package;
    pulling the front and back wall portions generally apart to separate the top seal of the package;
    separating the line of weakness in the front wall portion positioned at least partially below the hanging feature having reinforced edges relative to the top seal extending through the front and back wall portions within the top seal; and
    directing a separation of the front wall portion around the hanging feature therein with upwardly extending portions of the line of weakness that extend laterally adjacent to sides of the hanging feature so that the tab portion remains sealed to the back wall portion during opening of the sealed package, the tab portion including the hanging feature.

10. The method of claim 9 further comprising resealing the front and back wall portions together by pressing the front and back wall portions together within the top seal.

11. The method of claim 9 wherein directing the separation comprises directing a separation that extends to the top edge of the front wall portion.

12. The method of claim 9 wherein directing the separation comprises direction a separation that encircles the hanging feature.

13. A method of forming the package of claim 1, the method comprising:
   forming the line of weakness in a web of flexible film including a middle portion and upwardly extending side portions;
   forming the web of flexible film into the package having the front and back wall portions;
   sealing the front and back wall portions along a top portion thereof to create the top seal, the top seal including the line of weakness; and
   forming the hanging feature having reinforced edges relative to the top seal extending through the front and back wall portions within the top seal above and between the line of weakness.

14. The method of claim 13 wherein forming the line of weakness comprises forming a through cut configured to extend below the hanging feature and scribed lines configured to extend laterally along sides of the hanging feature.

15. The method of claim 14 wherein forming the scribed lines extending laterally along sides of the hanging feature comprises forming a scribed line that, together with the through cut, is configured to encircle the hanging feature.

* * * * *

UNITED STATES PATENT AND TRADEMARK OFFICE
CERTIFICATE OF CORRECTION

PATENT NO. : 9,878,837 B2
APPLICATION NO. : 14/466006
DATED : January 30, 2018
INVENTOR(S) : Paul Veternik et al.

Page 1 of 1

It is certified that error appears in the above-identified patent and that said Letters Patent is hereby corrected as shown below:

On the Title Page

Column 1, Lines 1-2, delete "Intercontinental Great Brands LLC" and insert -- Kraft Foods R & D, Inc., Deerfield, IL (US) --, therefor.

Signed and Sealed this
Third Day of July, 2018

Andrei Iancu
*Director of the United States Patent and Trademark Office*